(12) United States Patent
Rochelle et al.

(10) Patent No.: US 8,816,078 B2
(45) Date of Patent: Aug. 26, 2014

(54) ACIDIC GAS REMOVAL BY AQUEOUS AMINE SOLVENTS

(75) Inventors: Gary Rochelle, Austin, TX (US); Stephanie Freeman, Austin, TX (US); Xi Chen, Austin, TX (US); Thu Nguyen, Austin, TX (US); Alexander Voice, Austin, TX (US); Humera Rafique, Austin, TX (US)

(73) Assignee: Board of Regents, The University of Texas System, Austin, TX (US)

(*) Notice: Subject to any disclaimer, the term of this patent is extended or adjusted under 35 U.S.C. 154(b) by 666 days.

(21) Appl. No.: 13/004,606

(22) Filed: Jan. 11, 2011

(65) Prior Publication Data
US 2011/0171093 A1  Jul. 14, 2011

Related U.S. Application Data

(60) Provisional application No. 61/294,176, filed on Jan. 12, 2010, provisional application No. 61/386,312, filed on Sep. 24, 2010.

(51) Int. Cl.
C07D 241/04 (2006.01)
C07D 295/02 (2006.01)
C07C 211/12 (2006.01)
C07C 309/14 (2006.01)
B01D 53/14 (2006.01)

(52) U.S. Cl.
CPC ...... B01D 53/1456 (2013.01); B01D 2257/504 (2013.01); B01D 2257/308 (2013.01); B01D 2257/304 (2013.01); B01D 2251/80 (2013.01); B01D 2257/306 (2013.01); B01D 53/1493 (2013.01)
USPC ............. 544/358; 564/511; 562/104

(58) Field of Classification Search
USPC ........................... 423/228; 544/358
See application file for complete search history.

(56) References Cited

U.S. PATENT DOCUMENTS

| | | | |
|---|---|---|---|
| 3,810,815 A * | 5/1974 | Massie | 428/412 |
| 4,064,151 A | 12/1977 | Hedaya et al. | |
| 4,217,238 A | 8/1980 | Sartori et al. | |
| 5,492,683 A | 2/1996 | Birbara et al. | |
| 5,618,506 A * | 4/1997 | Suzuki et al. | 423/228 |
| 5,622,681 A | 4/1997 | Grierson et al. | |

(Continued)

FOREIGN PATENT DOCUMENTS

| | | | | |
|---|---|---|---|---|
| WO | WO2007045679 | | 4/2007 | |
| WO | WO 2009/130238 | * | 10/2009 | C09D 7/02 |

OTHER PUBLICATIONS

"CO2 Capture by Absorption with Potassium Carbonate, First Quarterly Report 2007", DOE Progress Report 41440R20 for Cooperative Agreement DE-FC26-02NT41440, Apr. 27, 2007.

(Continued)

Primary Examiner — Stanley Silverman
Assistant Examiner — Daniel Berns
(74) Attorney, Agent, or Firm — Reed Smith LLP; Robert R. Riddle

(57) ABSTRACT

Compositions and methods related to the removal of acidic gas. In one embodiment, compositions and methods are provided for the removal of acidic gas from a gas mixture using an aqueous amine solvent comprising water, a first amine, and a second amine, wherein the first amine contributes at least 50% by weight of the solvent's total amine concentration.

18 Claims, 11 Drawing Sheets

(56) References Cited

U.S. PATENT DOCUMENTS

| | | |
|---|---|---|
| 6,436,174 B1 | 8/2002 | Grossmann et al. |
| 8,404,900 B2 * | 3/2013 | Kim et al. ............ 564/503 |
| 2007/0028774 A1 | 2/2007 | Rochelle |
| 2007/0044658 A1 | 3/2007 | Rochelle et al. |
| 2008/0125314 A1 * | 5/2008 | Shim et al. ............ 502/401 |
| 2008/0127831 A1 | 6/2008 | Rochelle et al. |
| 2008/0236390 A1 * | 10/2008 | Anders et al. ............ 95/183 |
| 2011/0039995 A1 * | 2/2011 | Lohmeijer et al. ............ 524/130 |

OTHER PUBLICATIONS

Oynekan, Rochelle, "Alternative Stripper Configurations for CO2 Capture by Aqueous Amines", AIChE Journal, Accepted, 2007.

Yasuyuki Yagi, et al., "Development and Improvement of CO2-Capture System", Presented at the 8th GHGT Conference, 2006.

International Search Report to PCT/US09/45075 dated Aug. 14, 2009.

* cited by examiner

ACIDIC GAS REMOVAL BY AQUEOUS AMINE SOLVENTS

CROSS-REFERENCE TO RELATED APPLICATIONS

This application claims priority to U.S. Provisional Patent Application Ser. Nos. 61/294,176, filed Jan. 12, 2010 and 61/386,312, filed Sep. 24, 2010, the entire disclosures of which are incorporated by reference.

BACKGROUND

As concerns of global climate changes spark initiatives to reduce carbon dioxide emissions, its economic removal from gas streams is becoming increasingly important. Removal by absorption/stripping is a commercially promising technology, as it is well suited to sequester carbon dioxide ($CO_2$). Such carbon dioxide emissions may be produced by a variety of different processes, such as the gas stream produced by coal-fired power plants. The removal of $CO_2$ can be an expensive process, potentially increasing the cost of electricity by 50% or more. Therefore, technology improvements to reduce the costs associated with the removal of $CO_2$ are highly desirable.

The use of absorption and stripping processes with aqueous solvents such as alkanolamines and promoted potassium carbonate is a known, effective technology for the removal and capture of $CO_2$ from flue gas, natural gas, hydrogen, synthesis gas, and other gases. U.S. Pat. Nos. 4,477,419 and 4,152,217, each of which is incorporated herein by reference, describe aspects of this technology. The first generation of technology relating to alkanolamine absorption/stripping uses aqueous solutions of monoethanolamine (MEA). Advances in this technology have provided other alkanolamine solvents for $CO_2$ treating in various industries. Monoethanolamine (MEA), diethanolamine (DEA), and the hindered amine AMP are used alone in an aqueous solution. Typical solvent blends include a methyldiethanolamine (MDEA) solution promoted by piperazine or other secondary amines. Also, potassium carbonate solvents are commonly promoted by DEA or other reactive amines.

Gas absorption is a process in which soluble components of a gas mixture are dissolved in a liquid. Stripping is essentially the inverse of absorption, as it involves the transfer of volatile components from a liquid mixture into a gas. In a typical $CO_2$ removal process, absorption is used to remove $CO_2$ from a combustion gas, and stripping is subsequently used to regenerate the solvent and capture the $CO_2$ contained in the solvent. Once $CO_2$ is removed from combustion gases and other gases, it can be captured and compressed for use in a number of applications, including sequestration, production of methanol, and tertiary oil recovery.

The conventional method of using absorption/stripping processes to remove $CO_2$ from gaseous streams is described in U.S. Pat. No. 4,384,875, which is incorporated herein by reference. In the absorption stage, the gas to be treated, containing the $CO_2$ to be removed, is placed in contact, in an absorption column, with the chosen absorbent under conditions of pressure and temperature such that the absorbent solution removes virtually all the $CO_2$. The purified gas emerges at the top of the absorption column and, if necessary, it is then directed towards a scrubber employing sodium hydroxide, in which the last traces of $CO_2$ are removed. At the bottom of the absorption column, the absorbent solution containing $CO_2$ (also called "rich solvent") is drawn off and subjected to a stripping process to free it of the $CO_2$ and regenerate its absorbent properties.

To effect the regeneration of the absorbent solution, the rich solvent drawn off from the bottom of the absorption column is introduced into the upper half of a stripping column, and the rich solvent is maintained at its boiling point under pressure in this column. The heat necessary for maintaining the boiling point is furnished by reboiling the absorbent solution contained in the stripping column. The reboiling process is effectuated by indirect heat exchange between part of the solution to be regenerated located in the lower half of the stripping column and a hot fluid at appropriate temperature, generally saturated water vapor. In the course of regeneration, the $CO_2$ contained in the rich solvent is released and stripped by the vapors of the absorbent solution. Vapor containing the stripped $CO_2$ emerges at the top of the stripping column and is passed through a condenser system which returns to the stripping column the liquid phase resulting from the condensation of the vapors of the absorbent solution. At the bottom of the stripping column, the hot regenerated absorbent solution (also called "lean solvent") is drawn off and recycled to the absorption column after having used part of the heat content of the solution to heat, by indirect heat exchange, the rich solvent to be regenerated, before its introduction into the stripping column.

In simple absorption/stripping as it is typically practiced in the field, aqueous rich solvent is regenerated at 100-160° C. in a simple, countercurrent, reboiled stripper operated at a single pressure, which is usually 1-2 atm. The rich solvent feed is preheated by cross-exchange with hot lean solvent to within 5-30° C. of the stripper bottoms. The overhead vapor is cooled to condense water, which is returned as reflux to the countercurrent stripper. When used for $CO_2$ sequestration and other applications, the product $CO_2$ is compressed to 100-150 atm.

Commercially used amines that are used by themselves in water as absorbers include monoethanolamine, diethanolamine, methyldiethanolamine, diglycolamine, diisopropanolamine, some hindered amines, and others (Kohl and Nielsen (1997)). These amines are soluble or miscible with water at ambient temperature at high concentrations that are used in the process to maximize capacity and reduce sensible heat requirements. Other amines, including piperazine, are used in combination with methyldiethanolamine and other primary amines.

A number of mono- and polyamines, including piperazine, are identified as potentially useful solvent components but have not been used because they are insufficiently soluble in water when used by themselves. Piperazine is a diamine that has previously been studied as a promoter for amine systems to improve kinetics. In water at 25° C., solid piperazine has a solubility less than 2 M, so it cannot be used in traditional systems at concentrations that give adequate $CO_2$ capacity for good energy performance. BASF has disclosed the use of piperazine in combination with other amines (such as alkanolamines) or highly water soluble organics (such as triethyleneglycol) to promote the water solubility of piperazine as described in Canadian Patent No. 2651265.

SUMMARY

The present disclosure generally relates to the removal of acidic gases, including carbon dioxide and hydrogen sulfide, from flue gas or other gases through aqueous absorption and stripping processes. More particularly, in some embodiments, the present disclosure relates to methods and compositions for the removal of acidic gas from a gas mixture using two or more closely related amines where at least one of the amines is limited in useful concentration by precipitation of solids.

In one embodiment, the present disclosure provides an aqueous amine solvent comprising water, a first amine, and a second amine, wherein the first amine contributes at least 50% by weight of the solvent's total amine concentration.

In another embodiment, the present disclosure provides a method comprising contacting an acidic gas with an aqueous amine solvent, wherein the aqueous amine solvent comprises water, a first amine, and a second amine, wherein the first amine contributes at least 50% by weight of the solvent's total amine concentration.

The features and advantages of the present invention will be readily apparent to those skilled in the art. While numerous changes may be made by those skilled in the art, such changes are within the spirit of the invention.

DRAWINGS

Some specific example embodiments of the disclosure may be understood by referring, in part, to the following description and the accompanying drawings.

FIG. 1 is a graph showing the comparison of solid solubility between concentrated piperazine ("PZ") and 4 m PZ+4 m 2-methyl piperazine ("2MPZ"). Data are shown for 8 m PZ (●), 10 m PZ (○), and 4 m PZ+4 m 2MPZ (□). The solubility window extends at least as far as the dashed lines.

Figure 9:
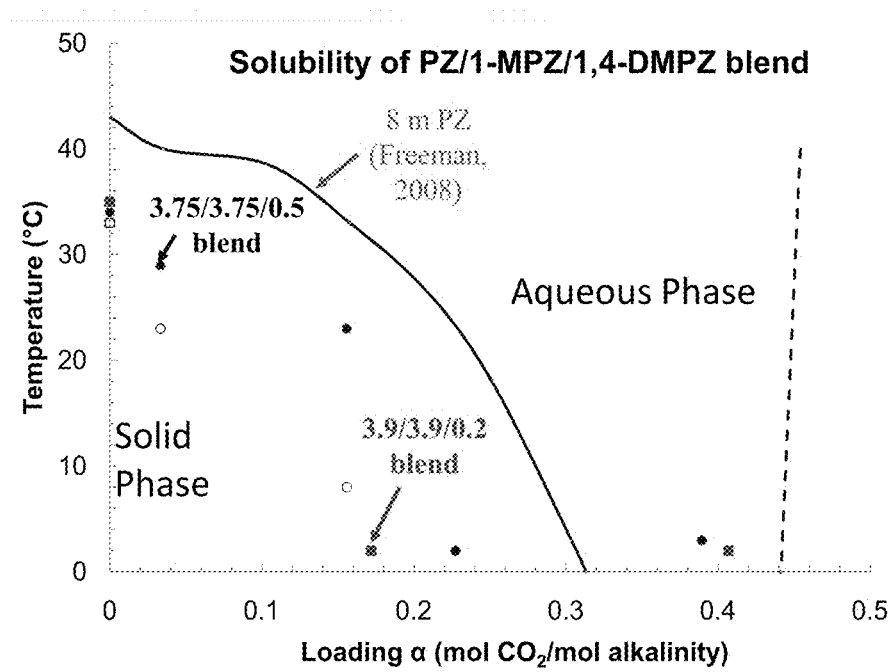

FIG. 9 is a graph showing the solid solubility limits of the blend: piperazine/1-methyl-piperazine/1,4-dimethyl-piperazinePZ. Open points are solutions that precipitate solids. Filled points do not precipitate solids. Circles are 3.75 m PZ/3.75 m 1-MPZ/0.5 m 2,5-DMPZ. Squares are 3.9 m PZ/3.9 m 1-MPZ/0.2 m 2,5-DMPZ.

Figure 10:
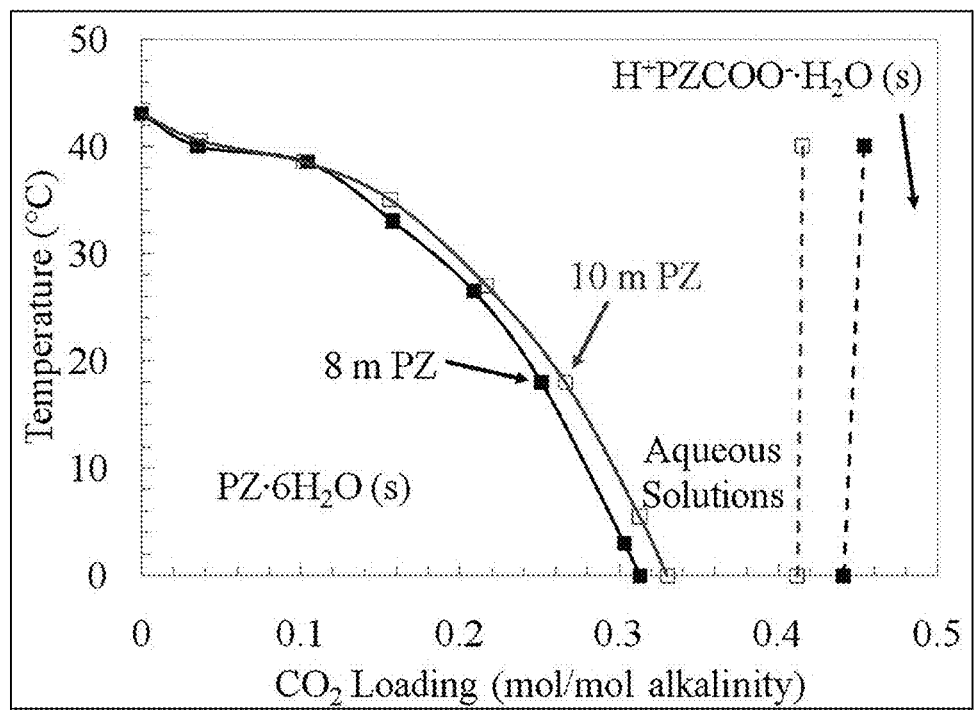

FIG. 10 is a graph showing solid-liquid transition temperatures for aqueous PZ.

Figure 11:
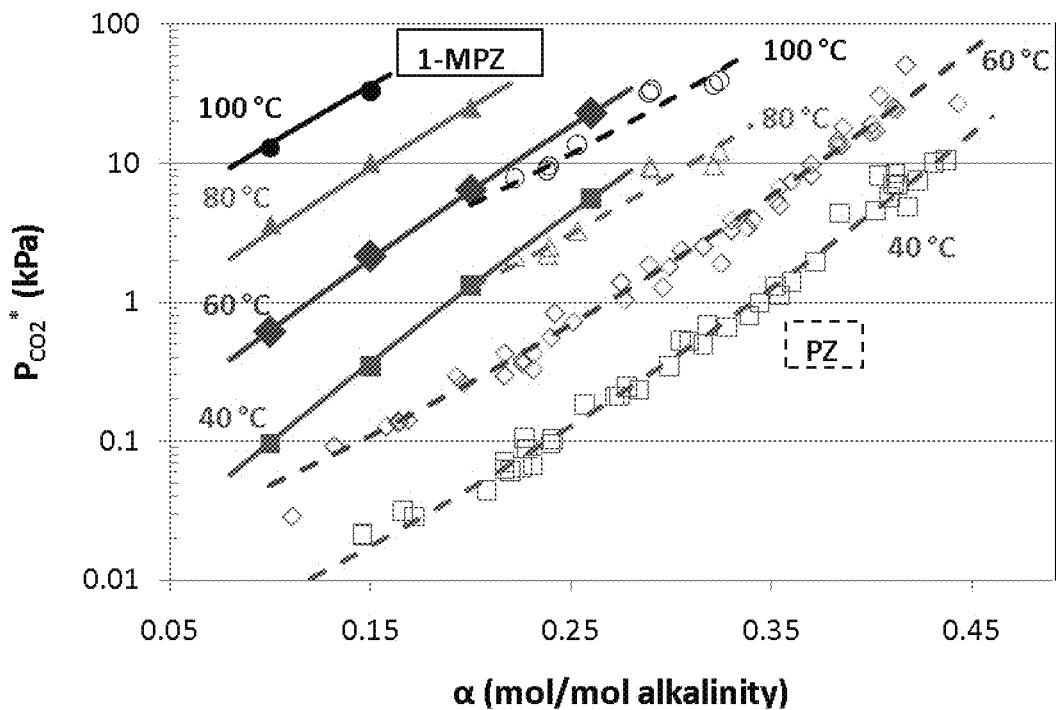

FIG. 11 is a graph depicting $CO_2$ partial pressure vs. loading for 8 m 1-MPZ (filled points and solid lines), compared with PZ (open points and dashed line).

Figure 12:
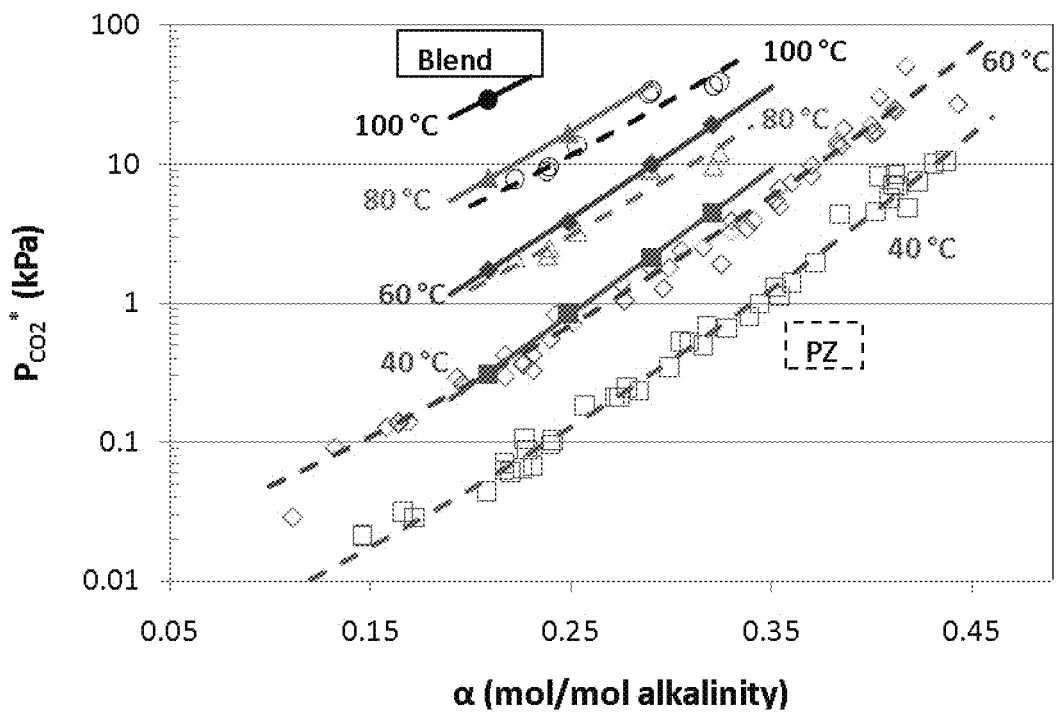

FIG. 12 is a graph depicting $CO_2$ partial pressure vs. loading for 3.75 m PZ/3.75 m 1-MPZ/0.5 m 1,4-DMPZ (filled points and solid lines), compared with PZ (open points and dashed line).

Figure 13:
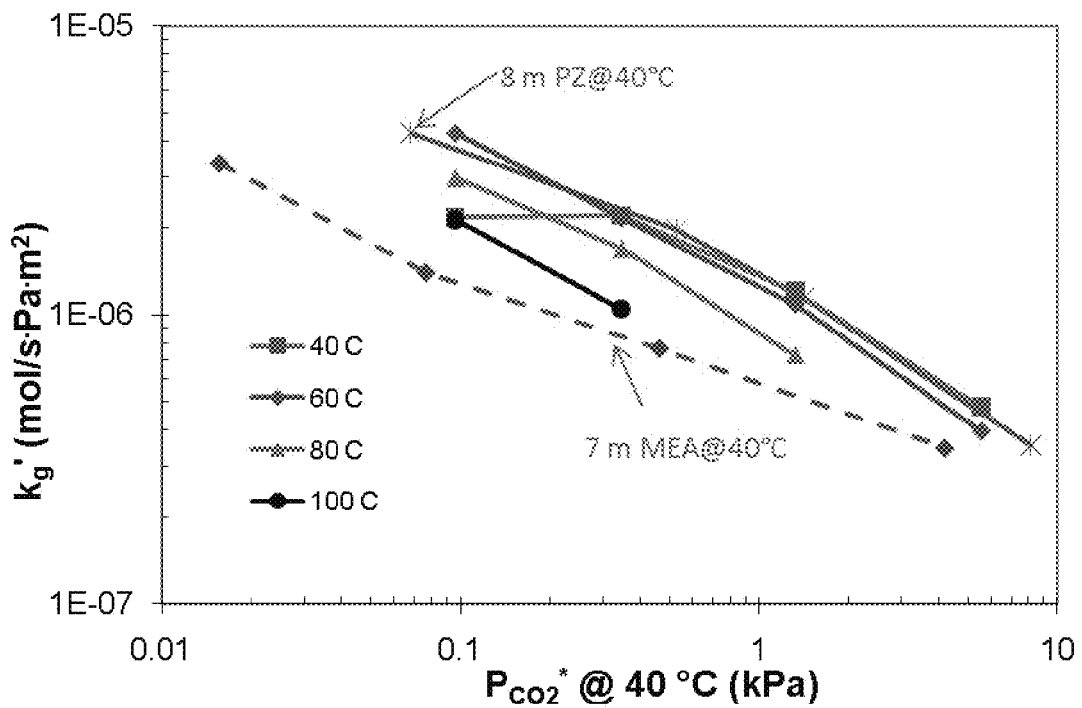

FIG. 13 is a graph depicting the $CO_2$ mass transfer rate for 8 m 1-MPZ compared with 8 m PZ and 7 m MEA.

Figure 14:
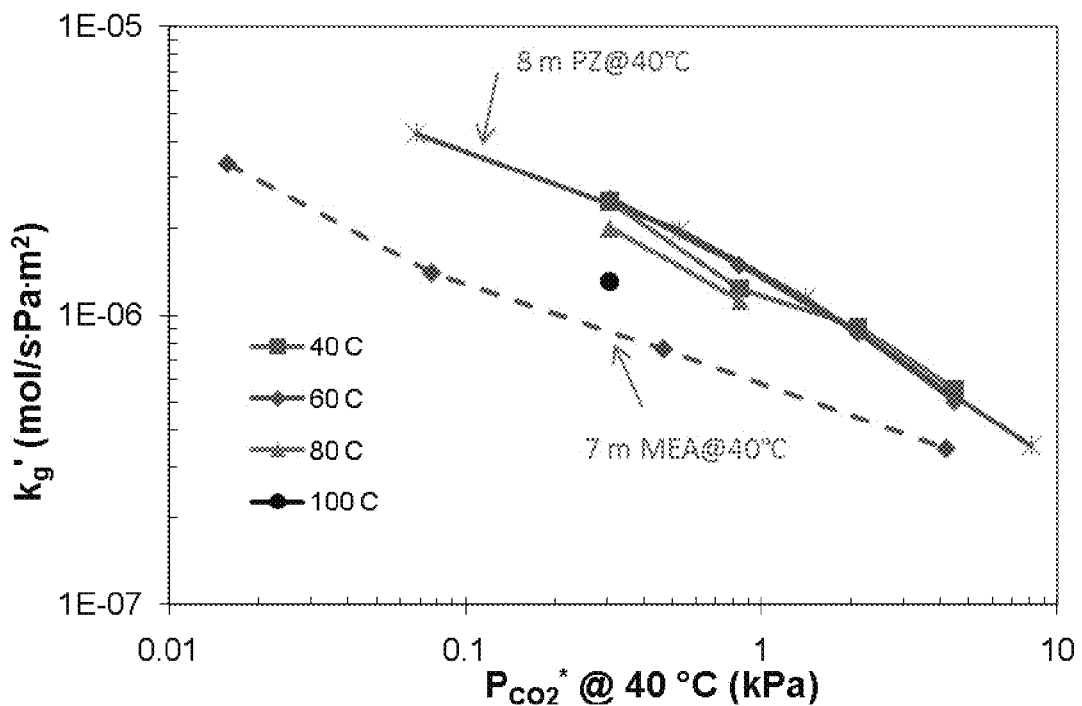

FIG. 14 is a graph depicting the $CO_2$ mass transfer rate for 3.75 m PZ/3.75 m 1-MPZ/0.5 m 1,4-DMPZ.

Figure 15:
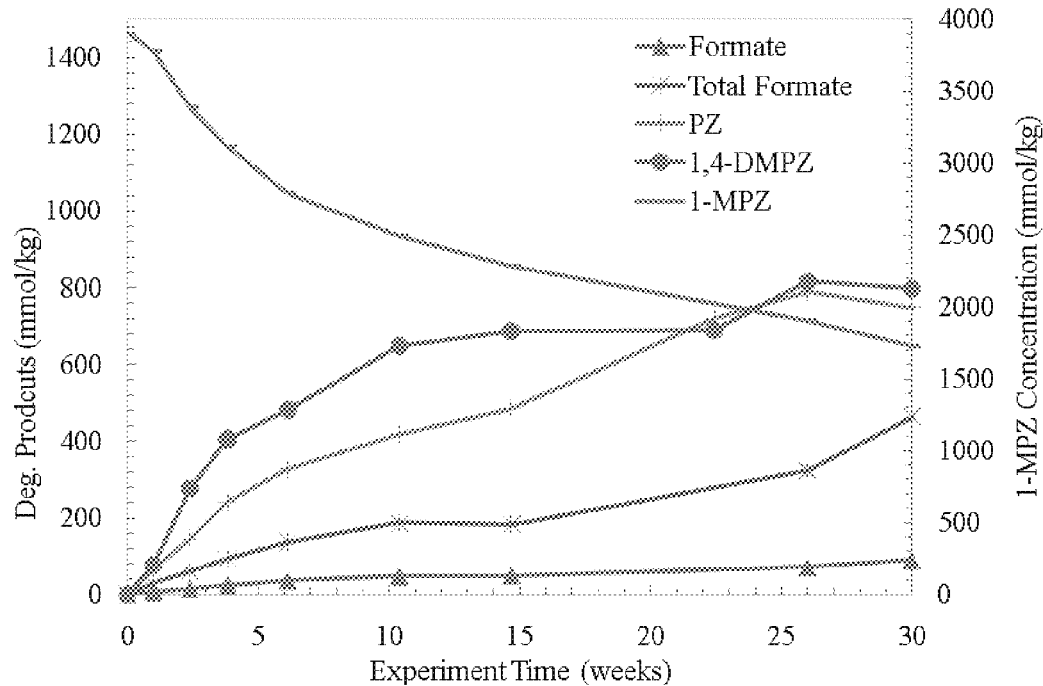

FIG. 15 is a graph showing the concentration profile for 8 m 1-MPZ, $\alpha$=0.3 at 150° C. for 30 weeks.

Figure 16:
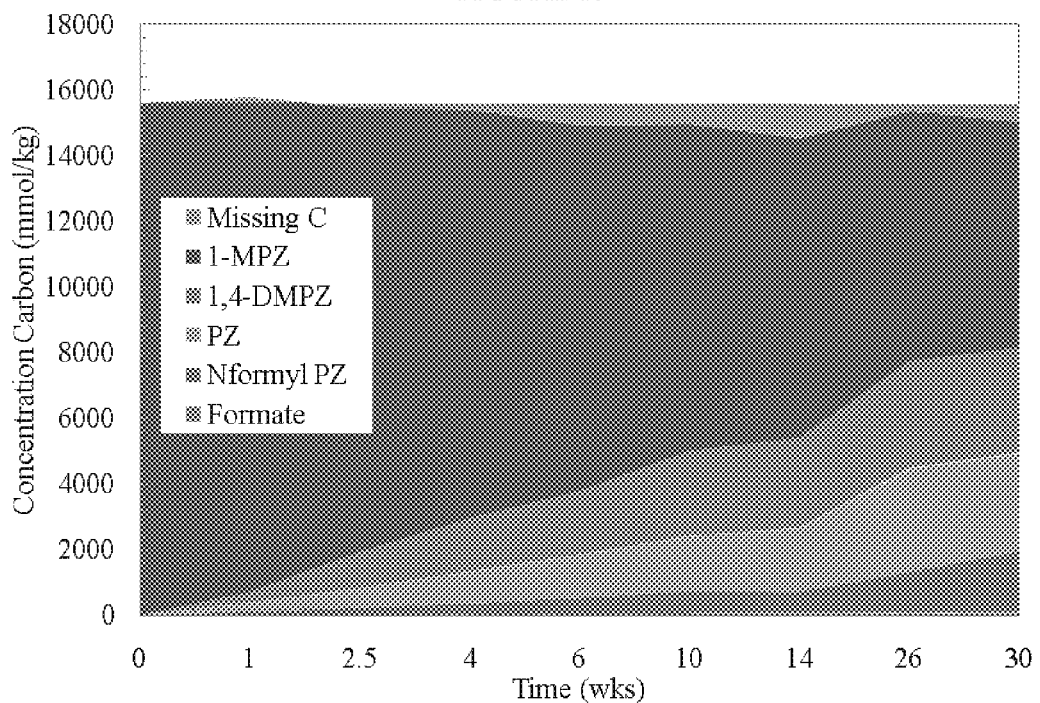

FIG. 16 is a graph showing the carbon mass balance for 8 m 1-MPZ degraded at 150° C. for 30 weeks.

Figure 17:
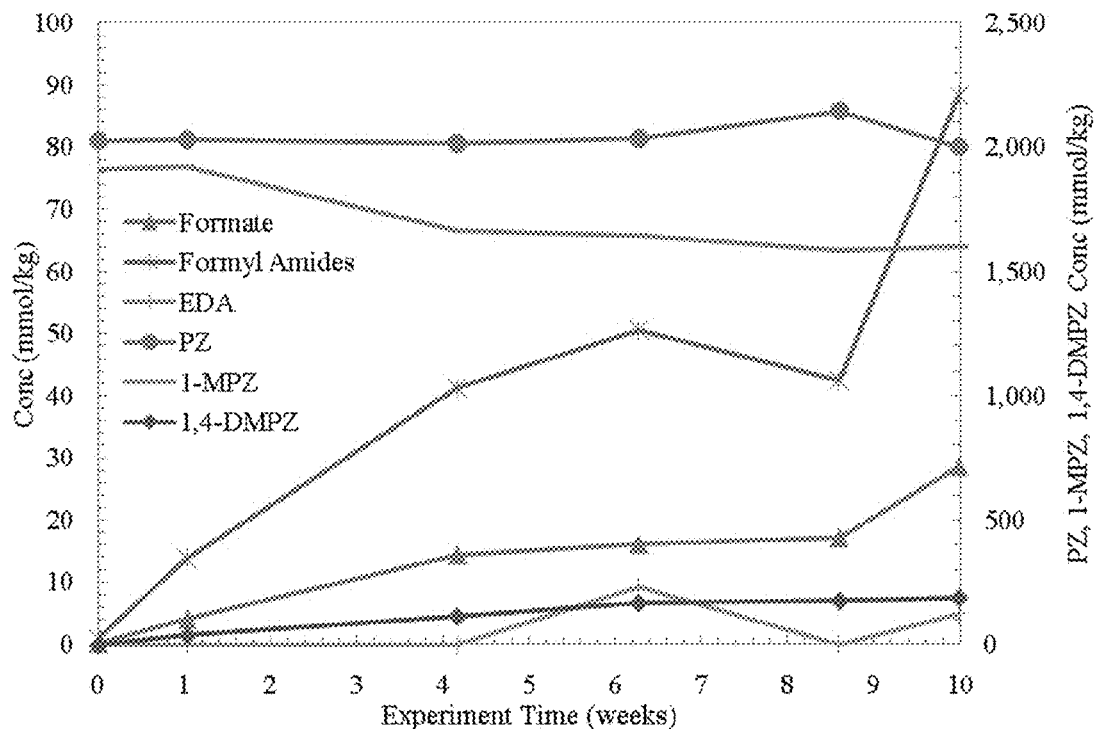

FIG. 17 is a graph showing the concentration profile for 4 m PZ+4 m 1-MPZ, $\alpha$=0.3 at 150° C. for 10 weeks.

Figure 18:
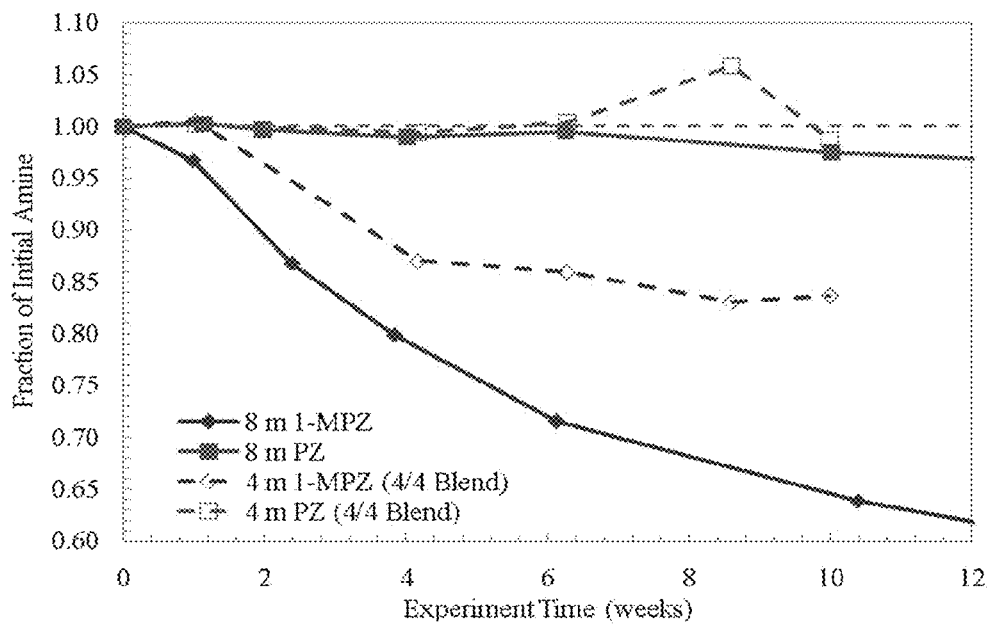

FIG. 18 is a graph comparing PZ (squares) and 1-MPZ (diamonds) loss when degraded at 150° C. alone (solid) and in a 4/4 blend (dashed).

Figure 19:
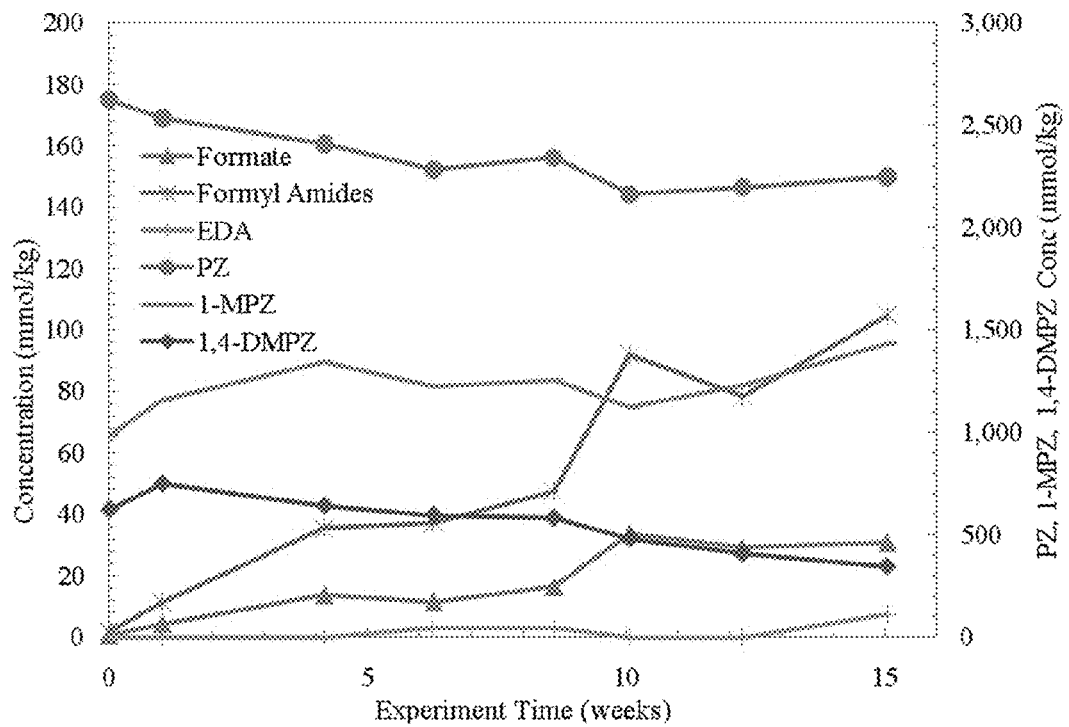

FIG. 19 is a graph showing the concentration profile for a blend of 5 m PZ, 2 m 1-MPZ, and 1 m 1,4-DMPZ, $\alpha$=0.3 at 150° C. for 15 weeks.

Figure 20:
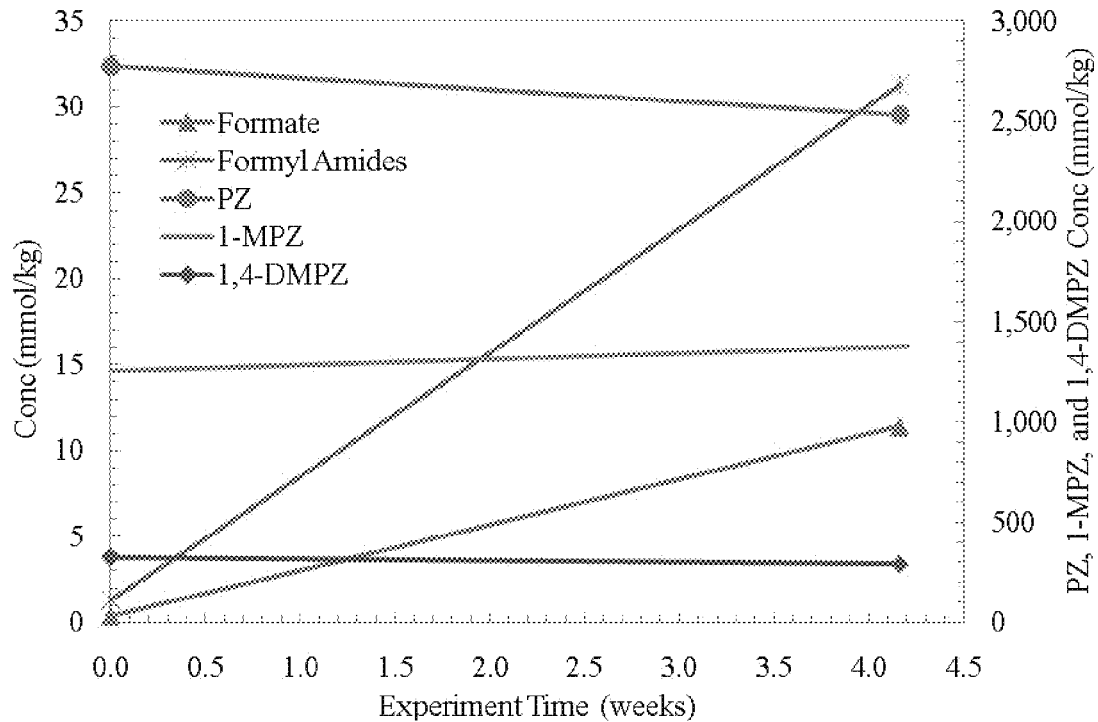

FIG. 20 is a graph showing the concentration profile for a blend of 5 m PZ+2.5 m 1-MPZ+0.5 m 1,4-DMPZ, $\alpha$=0.3 at 150° C. for 4 weeks.

Figure 21:
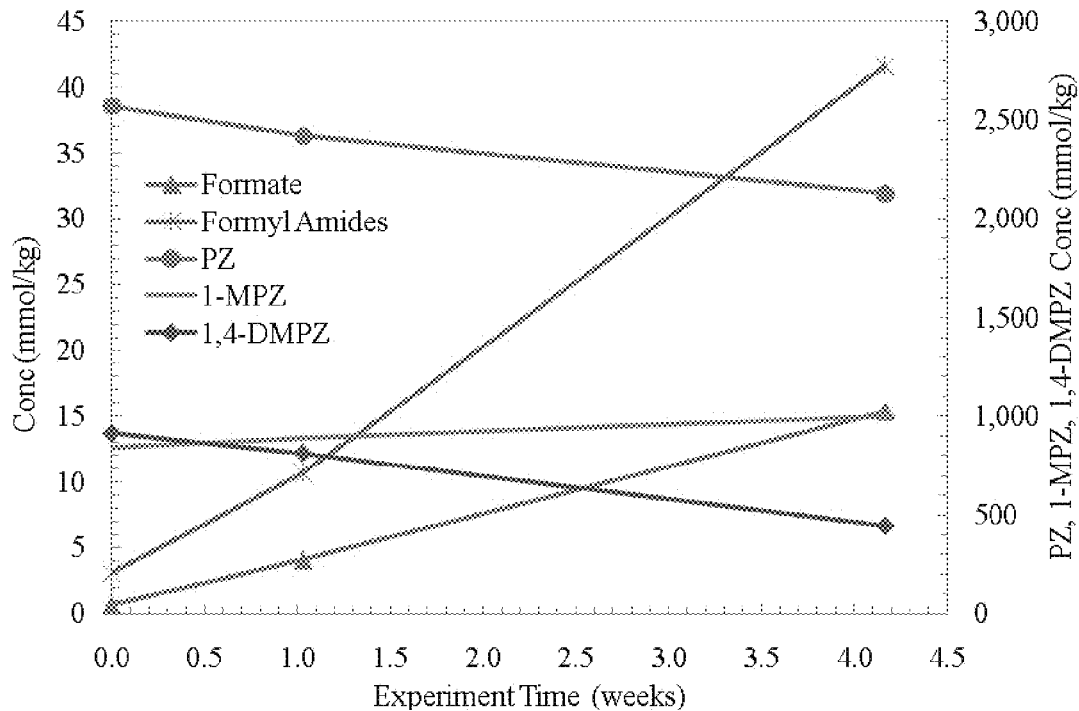

FIG. 21 is a graph showing the concentration profile for a blend of 5 m PZ+1.5 m 1-MPZ+1.5 m 1,4-DMPZ, $\alpha$=0.3 at 150° C. for 4 weeks.

Figure 22:
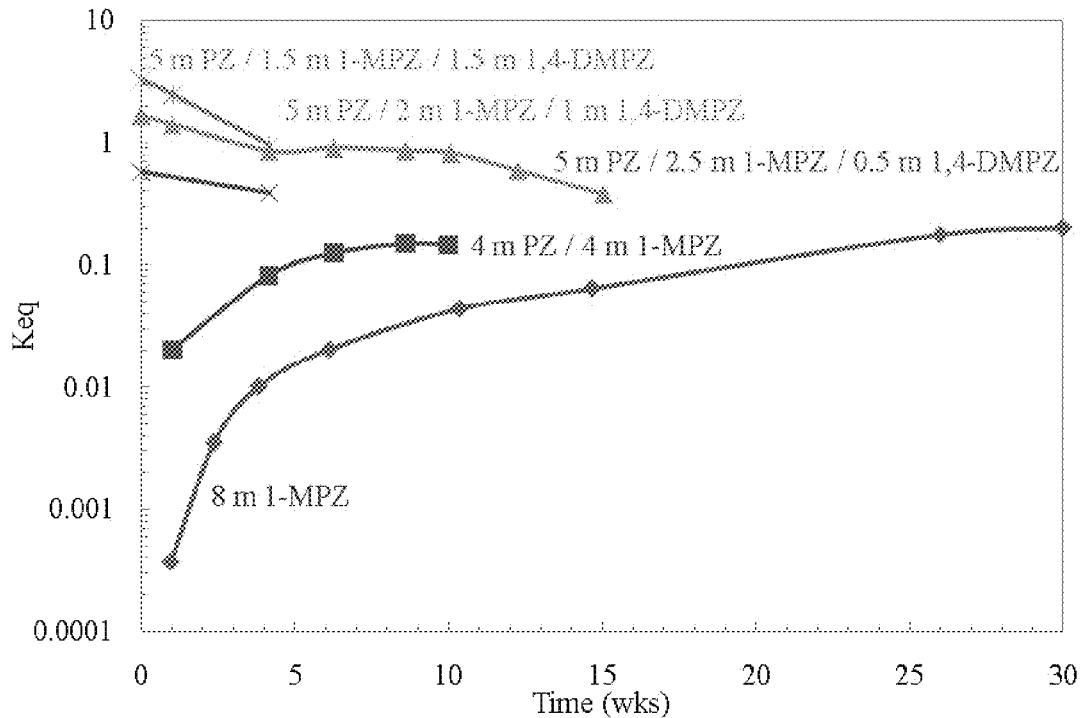

FIG. 22 is a graph depicting the equilibrium constant for a blend of PZ+1-MPZ+1,4-DMPZ solutions thermally degraded at 150° C. (a=0.3).

While the present disclosure is susceptible to various modifications and alternative forms, specific example embodiments have been shown in the figures and are described in more detail below. It should be understood, however, that the description of specific example embodiments is not intended to limit the invention to the particular forms disclosed, but on the contrary, this disclosure is to cover all modifications and equivalents as illustrated, in part, by the appended claims.

DESCRIPTION

The present disclosure generally relates to aqueous amine solvents, which may be useful for among other things, the removal of acidic gases, including carbon dioxide and hydrogen sulfide, from flue gas or other gases through aqueous absorption and stripping processes. More particularly, in some embodiments, the present disclosure relates to methods and compositions for improving the solid solubility of amines. In some embodiments, the compositions and methods of the present disclosure may be used for the removal of acidic gas from a gas mixture. In one embodiment, the present disclosure provides an aqueous amine solvent comprising water, a first amine, and a second amine, wherein the first amine contributes at least 50% by weight of the solvent's total amine concentration. In some embodiments, at least one of the amines is limited in useful concentration by precipitation of solids to remove acidic gas from a gas mixture. As used herein, the term "closely related amines" refers to amines that differ from each other by the addition or removal of one methyl (—$CH_3$) group or one methylene (—$CH_2$—) group; rearrangement of one methyl (—$CH_3$) group or one methylene (—$CH_2$—) group; amines that are cis or trans isomers; and/or amines that differ in their orientation (e.g., right or left-handed orientation). In another embodiment, the present disclosure provides an aqueous amine solvent comprising piperazine, 1-methyl-piperazine, and dimethyl-piperazine. In yet another embodiment, the present disclosure provides an aqueous amine solvent comprising piperazine and hexamethylenediamine.

The present disclosure is based in part on the observation that amines are frequently identified that have desirable properties but cannot be used because of the precipitation of solids at lean or rich conditions at total amine concentrations that are not high enough to be useful. The present disclosure addresses this problem by, among other things, providing aqueous solvents of two or more amines that provide acceptable performance with reduced precipitation of solids. In some embodiments, a blend of two or more closely related amines may preserve the properties of the best amine while providing greater total amine concentration and increased operating capacity.

Solid precipitation usually occurs as a highly organized crystal, therefore even minor changes in molecular structure will prevent the coprecipitation of closely related molecules. Accordingly, in some embodiments of the present disclosure, solvents comprising two or more closely related amines can provide for a greater total concentration of amine without solid precipitation. It can be expected that each of two or more amines can be used at approximately its maximum concentration in the absence of other amines. Therefore, the total allowable amine concentration in a solvent will be approximately the sum of the maximum concentration of each amine in the composition.

The methods and compositions of the present disclosure may have several advantages including, but not limited to, reduced energy consumption, improved secondary environmental impact, higher T stripping with reduced energy consumption and reduced capital cost. Furthermore, the methods and compositions of the present disclosure may also provide an increased rate of $CO_2$ absorption giving reduced absorber capital cost and reduced energy consumption.

In determining amines suitable for use in the present disclosure, a number of properties may be evaluated to determine the usefulness of a particular amine for acidic gas removal. Such properties may include, but are not limited to, $CO_2$ absorption rate, heat of $CO_2$ desorption, loading capacity, operating capacity, thermal degradation rate, oxidative degradation rate, environmental sensitivity, and volatility. Each of these properties are discussed in more detail below.

The $CO_2$ absorption rate of a particular amine may be useful in determining whether an amine is desirable for acidic gas removal. In general, a greater rate of $CO_2$ absorption will allow for the use of less packing, reduced lean loading, or greater rich loading, which in turn can reduce energy consumption. The rate of $CO_2$ absorption can be characterized as the normalized flux, kg' (gmol/$m^2$-s-Pa), measured in a model contactor such as a wetted wall column. Similarly, a greater heat of $CO_2$ desorption will reduce the energy requirement of an absorber/stripper relying upon temperature swing regeneration.

At a given amine concentration, greater loading capacity will also reduce total energy consumption by reducing the sensible heat required to heat the solvent after the cross exchanger. The loading capacity is the practical difference between the rich loading expected at the bottom of the absorber and the lean loading achieved in the stripper or required to get adequate removal at the top of the absorber. For example, coal fired flue gas typically allows a rich loading that is in equilibrium with 5 kPA $CO_2$ at 40° C. (0.3 moles $CO_2$/equiv piperazine ("PZ") with 8 m PZ). The required lean loading to get 90% $CO_2$ removal is approximately in equilibrium with 0.5 kPa $CO_2$ at 40° C. (0.4 moles $CO_2$/equiv PZ). The loading capacity is 0.1 moles $CO_2$/equiv PZ.

The operating capacity of a particular amine may also be useful in determining whether an amine is desirable for acidic gas removal. Greater operating capacity reduces the total energy requirement by reducing the need for sensible heat. Operating capacity is the loading capacity multiplied by the total concentration of amine, recalculated as moles $CO_2$/kg solvent (amine+water). Since operating capacity depends on the total concentration of amine in the solvent, it will be significantly lower in a solvent that cannot be operated at a greater concentration without the precipitation of solids. For example, if a piperazine solvent must be operated at a lean loading of 0.2 moles $CO_2$/equiv PZ and rich loading of 0.4 moles $CO_2$/equiv PZ, the maximum operating capacity with 5 m PZ is 1.4 moles/kg solvent. A higher concentration of piperazine cannot be used because it could precipitate solids from the lean solution at 0° C. under upset conditions.

A reduced rate of thermal degradation permits an amine solvent to be used at a greater regeneration temperature. With a greater regeneration temperature, temperature swing regeneration can produce acid gas at a greater pressure with savings in capital cost and energy cost. For example, 8 m PZ can be regenerated at 150° C. to produce $CO_2$ at 10 atm rather than 1.5 atm as with most other solvents.

Furthermore, an amine with a reduced rate of oxidative degradation is attractive because it reduces the makeup cost of the solvent and the cost of dealing with secondary impacts of degradation products. Amine solvents are also more attractive if they are more biodegradable, have less specific toxicity toward plants and animals, and if they are less volatile. Less volatility reduces the costs of makeup and/or water wash systems and also reduces the potential liability of additional environmental impacts.

The present disclosure provides a solvent comprising water, a first amine, and a second amine, wherein the first amine contributes at least 50% by weight of the solvent's total amine concentration. Amines suitable for use in the present disclosure generally may comprise a primary amine, a secondary amine, a tertiary amine or a hindered amine. In some embodiments, in order to compete with 30 wt % monoethanolamine (7 m), primary or secondary amines should be soluble to at least 7 moles amine/kg water. Tertiary and hindered amines can be competitive at somewhat lower concentration. Aqueous solvents suitable for use in the present disclosure may precipitate solids with no dissolved $CO_2$, at typical lean conditions giving an equilibrium $CO_2$ partial pressure of 0.1 to 1 kPA at 40° C., or at rich conditions giving an equilibrium $CO_2$ partial pressure of 1 to 100 kPA at 40° C.

One example of a suitable amine includes piperazine. The solubility of piperazine hexahydrate in water at ambient temperature is only about 2 moles/kg $H_2O$ (2 m). 8 m piperazine will precipitate protonated piperazine carbamate at an ambient temperature at a $CO_2$ loading greater than 0.45 moles/equivalent amine. In some embodiments, a solvent for use in the present disclosure may comprise piperazine and 2-methyl-piperazine. In a further embodiment, piperazine and 2-methyl-piperazine are each present in a concentration of about 2 to 6 molal. In another embodiment, piperazine is present in a concentration of about 5 to 8 molal and 2-methyl-piperazine is present in a concentration of about 1 to 3 molal. In some embodiments, a solvent for use in the present disclosure may comprise piperazine with 1-methyl-piperazine. In a further embodiment, piperazine and 1-methyl-piperazine are each present in a concentration of about 2 to 6 molal. In another embodiment, piperazine is present in a concentration of about 5 to 8 molal and 1-methyl-piperazine is present in a concentration of about 1 to 3 molal. In some embodiments, a solvent for use in the present disclosure may comprise piperazine and homopiperazine. In some embodiments, a solvent for use in the present disclosure may comprise 2-methyl-(2R)-piperazine (75336-86-6) and 2-methyl-(2S)-piperazine.

In some embodiments, a solvent for use in the present disclosure may comprise piperazine and hexamethylenediamine. Aqueous solution using concentrated piperazine, such as 8 piperazine (42 wt %), provides fast $CO_2$ absorption rate and good $CO_2$ capacity. Piperazine is stable up to 150° C. and resistant to oxidative degradation. However, the piperazine solvent will precipitate solids at lower T and extreme $CO_2$ loading. For example at 0° C., which may be encountered in a process upset, PZ.6 H$_2$O solids will precipitate and form 8 m PZ with a CO$_2$ loading less than 0.3. Hexamethylenediamine (HMDA) is not at attractive solvent when used in aqueous solution by itself. Its CO$_2$ capacity and CO$_2$ absorption rate will be limited because the equilibrium rich loading is high and too close to an appropriate equilibrium lean loading. However, it may be used in a mixture with piperazine to provide the alkalinity for CO$_2$ capacity and rate while reducing the total concentration of piperazine. For example, a mixture of 6 m piperazine with 2 m HMDA will be able to operate at greater rich and lean loading that the 8 m piperazine alone because the piperazine is at a lower concentration. HMDA is especially attractive in this mixture because it is less expensive than piperazine and because it shares the thermal stability of piperazine and can be used up to 150° C.

Another example of a suitable amine for use in the solvents of the present disclosure includes 2-amino-2-methyl-1-propanol (CAS 124-68-5). At rich conditions, solids will precipitate at ambient temperature if the concentration of 2-amino-2-methyl-1-propanol exceeds 5 m. In some embodiments, a solvent for use in the present disclosure may comprise 2-amino-2-methyl-1-propanol and 2-amino-2-methyl-1-butanol (10196-30-2). In some embodiments, a solvent for use in the present disclosure may comprise 2-amino-2-methyl-1-propanol and 2-(methylamino)-1-propanol (CAS 27646-78-2).

Another example of a suitable amine includes 2-sulfo-ethanoic acid neutralized by 1 mole KOH. Taurine neutralized with one mole of KOH and loaded to rich conditions with CO$_2$ will precipitate solids at ambient temperature at amine concentration greater than 2 m. 3.94 m potassium taurate loaded with 0.4 moles CO$_2$/mole taurate precipitated solids at 23° C. 2 m potassium taurate loaded with 0.5 moles CO$_2$/mole taurate precipitated solids at ambient temperature. In some embodiments, a solvent for use in the present disclosure may comprise 2-sulfo-ethanoic acid and 3-sulfo-propanoic acid, neutralized by KOH to the appropriate pH.

Another example of a suitable amine includes 2,5-trans-dimethyl piperazine, which precipitates at ambient temperature at rich conditions if the amine concentration exceeds 1 m. In some embodiments, a solvent for use in the present disclosure may comprise 2,5-dimethyl-, (2S,5R)-piperazine and 2,5-dimethyl-, (2R,5R)-piperazine (155836-53-6).

Another example of a suitable amine includes 1,2-diaminopropane (78-90-0), which precipitates solids at rich conditions in 8 m.

In another embodiment, the present disclosure provides a solvent comprising a blend of piperazine, 1-methyl-piperazine, and dimethyl-piperazine. Examples of suitable dimethyl-piperazine may include, but are not limited to, 1,4-dimethyl-piperazine and 2,5-dimethyl-piperazine.

Each of the piperazine, 1-methyl-piperazine, and dimethyl-piperazine may be present in an aqueous amine solvent of the present disclosure in any amount. In one embodiment, each of the piperazine, 1-methyl-piperazine, and dimethyl-piperazine may be present in an amount sufficient to produce an equilibrium at 100° C. to 160° C. In another embodiment, each of the piperazine, 1-methyl-piperazine, and dimethyl-piperazine may be present in amount sufficient to produce a blend with an equilibrium constant (K$_{eq}$) between 0.1 and 0.2, wherein K$_{eq}$=[PZ][DMPZ]/[1MPZ]$^2$, wherein [PZ], [DMPZ], and [1MPZ] are the ratios of the concentration of piperazine, di-methyl-piperazine, and 1-methyl-piperazine with respect to the overall amine concentration, respectively. In another embodiment, the piperazine, 1-methyl-piperazine, and dimethyl-piperazine may be present in amount sufficient to produce a blend with a K$_{eq}$ between 0.04 and 0.5. In other embodiments, the solvent may comprise from about 0.01% to about 99.9% piperazine, from about 0.01% to about 99.9% 1-methyl-piperazine, and from about 0.01% to about 99.9% dimethyl-piperazine, by weight of the blend. In one embodiment, the blend ratio of piperzine:1-methyl-piperazine:dimethyl-piperzine may be 3.9:3.9:0.2. In another embodiment, the blend ratio of piperzine:1-methyl-piperazine:dimethyl-piperazine may be 3.75:3.75:0.5. In another embodiment, the blend ratio of piperazine:1-methyl-piperazine:dimethyl-piperazine may be 3.5:3.5:0.5.

The aqueous amine solvent may further comprise water in an amount from about 0.01% to about 99.9% by weight of the blend.

In some embodiments, the present disclosure provides a method for the removal of acidic gases from a gas mixture comprising contacting the gas mixture with a solvent comprising water, a first amine, and a second amine, wherein the first amine contributes at least 50% by weight of the solvent's total amine concentration. In other embodiments, the present disclosure provides a method for the removal of acidic gases from a gas mixture comprising contacting the gas mixture with a solvent comprising two or more closely related amines.

While the present disclosure primarily discusses removal of CO$_2$, any acidic gas capable of removal by the methods of the present invention is contemplated by the present disclosure. Such acidic gases may include, but are not limited to, hydrogen sulfide (H$_2$S) or carbonyl sulfide (COS), CS$_2$, and mercaptans. Similarly, amines may be recovered following absorption of acidic gas. In certain embodiments, such recovery may occur through an evaporation process using a thermal reclaimer.

The gas mixture may be any gas mixture comprising an acid gas for which acid gas removal is desired and which is compatible with (i.e., will not be adversely affected by, or will not adversely react with) the methods of the present disclosure. In certain embodiments, the gas mixture may comprise any gas mixture produced as the byproduct of a chemical process. Suitable gas mixtures may comprise one or more of flue gas, natural gas, hydrogen gas and other gases.

To facilitate a better understanding of the present invention, the following examples of certain aspects of some embodiments are given. In no way should the following examples be read to limit, or define, the entire scope of the invention.

EXAMPLE 1

Piperazine with 2-methyl-(R,S)-Piperazine

Figure 1:
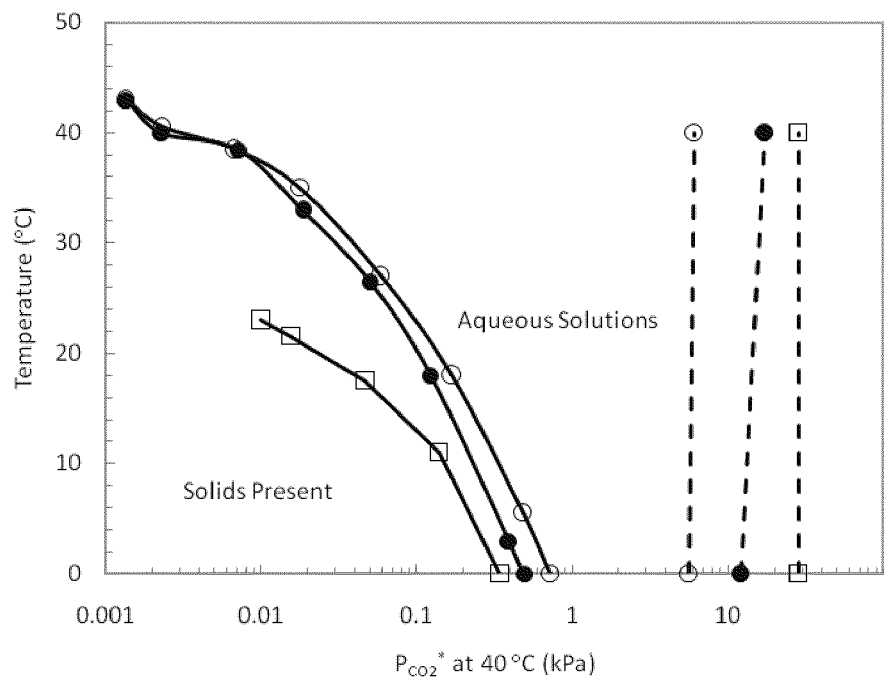

Piperazine (PZ) provides excellent properties for acid gas treating. It reacts very fast with CO$_2$ with a reasonable heat of reaction. However, with zero CO$_2$ loading (total dissolved CO$_2$), it only has a solubility of about 2 m in water at ambient temperatures because of the precipitation of PZ.6H$_2$O. With a loading of 0.3 moles CO$_2$/equiv PZ, 8 m PZ can be used at 0° C. without solids precipitation. The solubility window of PZ is shown in FIG. 1. However, 8 m PZ cannot be used at a loading less than 0.3 moles CO$_2$/equiv PZ or greater than 0.4 moles CO$_2$/equiv PZ without the risk of solid precipitation in the event of a process upset giving solvent at 0° C.

Figure 2:
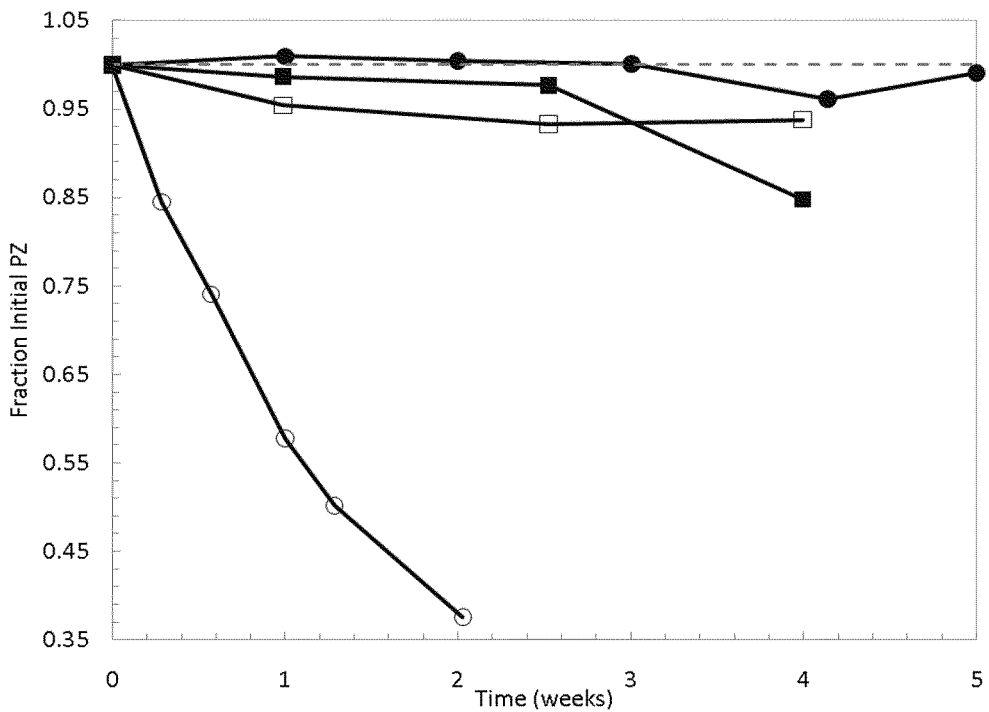
FIG. 2 is a graph showing the amine concentration profiles for thermal degradation at 150° C. for up to 5 weeks. Data are shown for 8 m PZ $\alpha$=0.3 (●), 7 m monoethanolamine ("MEA") $\alpha$=0.4 (○), 8 m 2MPZ $\alpha$=0.3 (□), and 4 m PZ+4 m 2MPZ (■).

2-methyl piperazine (2MPZ) has almost the same rate and equilibrium properties as PZ, but it is highly soluble over the full range of CO$_2$ loading. It differs from piperazine by the addition of one methyl group onto a carbon (or insertion of —CH$_2$— between a C and a H). Unfortunately, it is significantly more expensive than PZ and more difficult to produce commercially. However, a blend of 4 m PZ with 4 m 2MPZ uses less of the more expensive amine and has a wider window of solubility (See FIG. 1). The blend of 2MPZ and PZ is thermally stable like PZ alone as shown in FIG. 2. It is probable that 2MPZ will be produced commercially by reacting monoethanolamine with isopropanolamine in the presence of high pressure hydrogen and a hydrogenation catalyst. The resulting mixture of diamine would include piperazine and racemic 2-methyl piperazine with smaller quantities of 2,5-dimethyl piperazine and other products. This mixture would be effective for $CO_2$ capture without further purification.

The solid solubility and thermal degradation potential for 2-methylpiperazine (2MPZ) was investigated and compared to concentrated PZ solutions. A blend of 4 m PZ+4 m 2MPZ was found to have a larger solubility window than 8 or 10 m PZ. At room temperature (21° C.), a $CO_2$ loading of approximately 0.1 mole $CO_2$ per mole alkalinity was needed to maintain an aqueous solution, while 8 m PZ required 0.23 mole $CO_2$ per mol alkalinity. Crystallization was not observed at rich loadings of the 4 m PZ+4 m 2MPZ blend, a significant improvement over concentrated PZ. Solutions of 8 m 2MPZ and 4 m PZ+4 m 2MPZ degraded thermally slightly more than concentrated PZ, but significantly less than 7 m MEA. Concentrated PZ is known for its thermal resistance and MPZ alone and PZ+MPZ demonstrate similar qualities. It is believed that the resistance shown to thermal degradation by MPZ will allow higher stripper operating temperatures and pressure, improving energy performance.

The solid solubility of the blend of 4 m PZ+4 m 2-methylpiperazine (2MPZ) was studied over a range of $CO_2$ concentrations. At room temperature and without $CO_2$ present in solution, the blend is not aqueous and exists as a slurry with crystallized solvent present. The addition of $CO_2$ or an increase in temperature removes the crystals and produces an aqueous solution. The transition temperature for the blend is compared to concentrated (8 and 10 m) piperazine (PZ) solutions in FIG. 1. The transition temperature is the temperature at which a hot solution first produces crystals as it is slowly cooled. The x-axis of FIG. 1 is the equilibrium partial pressure of $CO_2$ ($P_{CO2}$*) at 40° C. and is a surrogate for $CO_2$ concentration or $CO_2$ loading. This value is calculated from $CO_2$ solubility curves. The equation for $CO_2$ solubility is shown below in Equation 1 for PZ and Equation 2 for PZ+2MPZ (Chen, 2009). FIG. 1 is plotted this way rather than against $CO_2$ loading to more directly compare the three solvents.

$$P^*_{CO_2,PZ}(kPa) = 36.1 - 93.2\left(\frac{1}{RT}\right)13.9\alpha + 8839\left(\frac{\alpha}{T}\right) + 14.3\alpha^2 \quad \text{Eqn. 1}$$

$$P^*_{CO_2,PZ+2MPZ}(kPa) = 36.56 - 11322.75\left(\frac{1}{T}\right) - 5.12\alpha + 8356.51\left(\frac{\alpha}{T}\right) + 0.736\alpha^2 \quad \text{Eqn. 2}$$

In FIG. 1, the area in the bottom left corner under each curve is where solids are present in each solution. As you travel up in $CO_2$ concentration or temperature and cross the phase line, the solutions are aqueous. For 8 and 10 m PZ, the dashed lines indicate that the solubility window extends at least this far as these solutions exist in aqueous phase. Solutions higher in $P_{CO2}$* have been observed to crystallize. The upper limit on $CO_2$ partial pressure for the blend has not been identified at this point as is at least as far as indicated. The data shown in FIG. 1 are tabulated in Table 1.

TABLE 1

Transition Temperatures for Concentrated PZ and a PZ + 2MPZ Blend

| Solution | $CO_2$ Loading (mol/mole Alkalinity) | $P_{CO2}$* at 40° C. (kPa) | Transition Temp (° C.) |
|---|---|---|---|
| 8 m PZ | 0 | 0.0014 | 43.0 |
| | 0.035 | 0.0023 | 40.0 |
| | 0.104 | 0.0070 | 38.5 |
| | 0.158 | 0.0185 | 33.0 |
| | 0.209 | 0.0499 | 26.5 |
| | 0.251 | 0.1216 | 18.0 |
| | 0.303 | 0.3892 | 3.0 |
| | 0.313 | 0.4862 | 0 |
| 10 m PZ | 0 | 0.0014 | 43 |
| | 0.037 | 0.0023 | 40.5 |
| | 0.102 | 0.0068 | 38.5 |
| | 0.156 | 0.0179 | 35 |
| | 0.217 | 0.0589 | 27 |
| | 0.266 | 0.1679 | 18 |
| | 0.313 | 0.4830 | 5.5 |
| | 0.330 | 0.7252 | 0 |
| 4 m PZ + 4 m 2MPZ | 0.088 | 0.0100 | 23 |
| | 0.108 | 0.0156 | 21.5 |
| | 0.159 | 0.0471 | 17.5 |
| | 0.209 | 0.1407 | 11 |
| | 0.250 | 0.3449 | 0 |

Thermal Degradation of 8 m 2-Methylpiperazine (2MPZ) and 4 m PZ+2MPZ

The propensity to degrade due to high temperatures has been studied for 8 m 2-methylpiperazine (2MPZ) and 4 m PZ+4 m 2MPZ. Samples of each solution were contained in stainless steel, well-sealed cylinders and placed in a forced-convection oven for extended periods of time. The loss of the original amine is tracked over time to determine the rate of thermal degradation. A comparison between 8 m PZ, 8 m 2MPZ, and 4 m PZ+4 m 2MPZ all at a loading ($\alpha$) of 0.3 moles $CO_2$ per mole alkalinity and 7 m MEA at an $\alpha$ of 0.4 moles $CO_2$ per mole alkalinity is shown in FIG. 2 (Davis, 2009; Freeman et al., 2009).

After 4 weeks time, 8 m PZ lost approximately 4% of the initial amine and 7 m MEA lost 67% after 2 weeks. In 4 weeks, the 8 m 2MPZ solution lost about 6% of the initial amine and the blend of 4 m PZ and 4 m 2MPZ lost 15% of the initial amine. PZ solutions have been shown to be highly resistant to thermal degradation up to 150° C. (Freeman et al., 2009). The 2MPZ solution is resistant as well compared to MEA, but fares slightly worse than the PZ. The blend of PZ and 2MPZ falls between the two sets of data except for the last point at 4 weeks.

The $CO_2$ solubility and adsorption/desorption rate were measured in the wetted wall column for 8 m MPZ and 4 m PZ/4 m MPZ blend with varied $CO_2$ loading (mol $CO_2$/mol alkalinity) and temperature. VLE models of $CO_2$ partial pressure were regressed from experimental data to calculate $CO_2$ capacity and enthalpy of $CO_2$ absorption ($\Delta H_{abs}$). The liquid film mass transfer coefficients (kg') and $CO_2$ partial pressures (P*) obtained were compared to those of 8 m piperazine (PZ) and 7 m monoethanolamine (MEA). MPZ and PZ-MPZ both have a slightly higher capacity than PZ. PZ-MPZ absorbs $CO_2$ at a slightly slower rate than 8 m PZ at rich loading, about 50% faster than 7 m MEA. kg' for MPZ is the same to 7 m MEA. Heat of $CO_2$ absorption for PZ-MPZ ($\Delta H_{abs}$=70 kJ/mol) and MPZ (72 kJ/mol) is close to that for PZ (70 kJ/mol).

Figure 3:
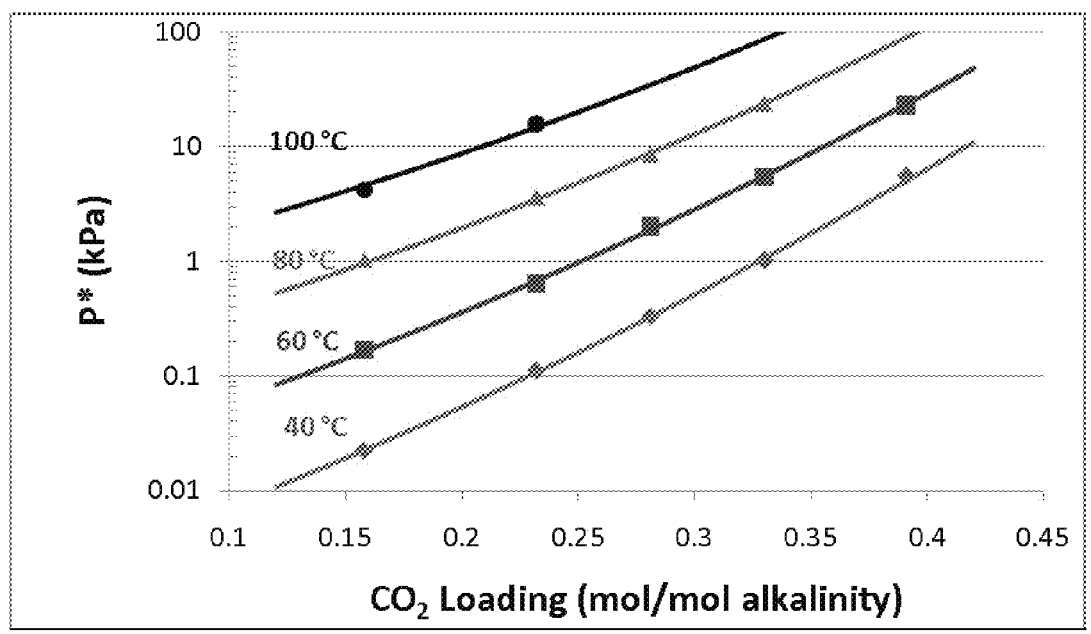
FIG. 3 is a graph depicting $CO_2$ partial pressure vs. loading for a 4 m PZ/4 m MPZ blend.
Figure 4:
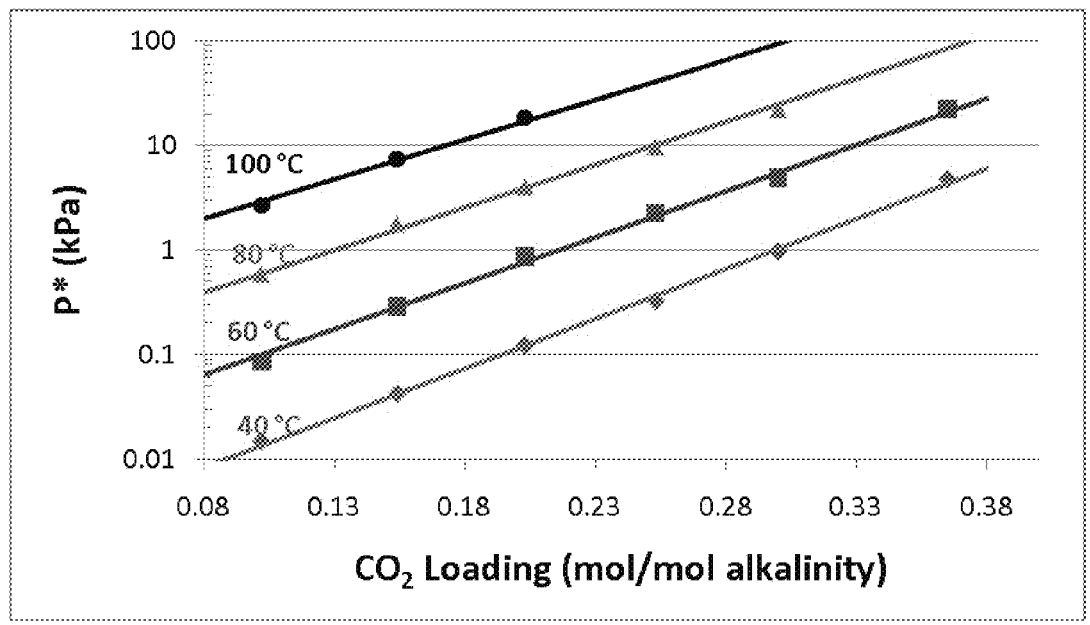
FIG. 4 is a graph depicting $CO_2$ partial pressure vs. loading for 8 m MPZ.

Results and Discussion $CO_2$ Partial Pressure $CO_2$ solubility for PZ-MPZ and MPZ are shown in FIG. 3 and FIG. 4, respectively. The filled points are experimental data at varied loadings and temperatures. Parameters for the following semi-empirical VLE equation (Equation 3) were regressed and the model was presented as solid curves in the figures. The curves fit the points satisfactorily.

$$\ln P = a + b/T + c \cdot \alpha + d \cdot \alpha/T + e \cdot \alpha^2 \qquad \text{Eqn. 3}$$

Absorption/Desorption Rates

Figure 5:
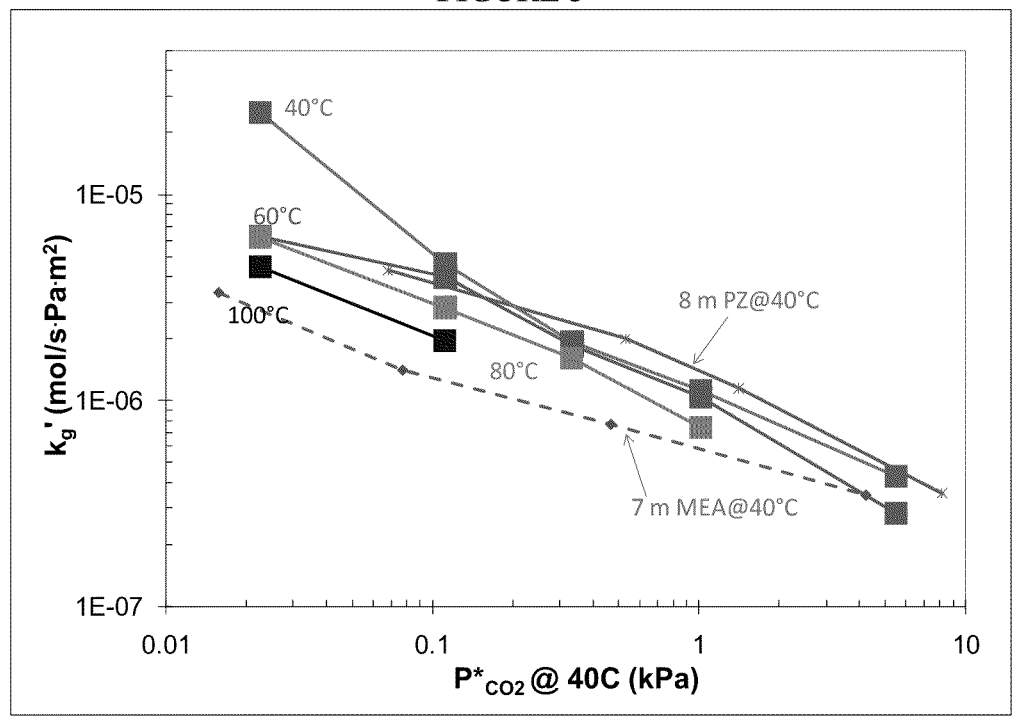
FIG. 5 is a graph depicting $CO_2$ mass transfer rate for 4 m PZ/4 m MPZ blend.

In FIG. 5, absorption/desorption rates for PZ-MPZ at 40° C., 60° C., 80° C. and 100° C. are compared with that of 7 m MEA and 8 m PZ at 40° C. In the range of 0.5 kPa to 5 kPa, the rate for PZ-MPZ is slightly less than PZ but higher than MEA. Temperature does not have a significant effect on the absorption rate of PZ-MPZ in the practical conditions for absorber (40-60° C.).

Figure 6:
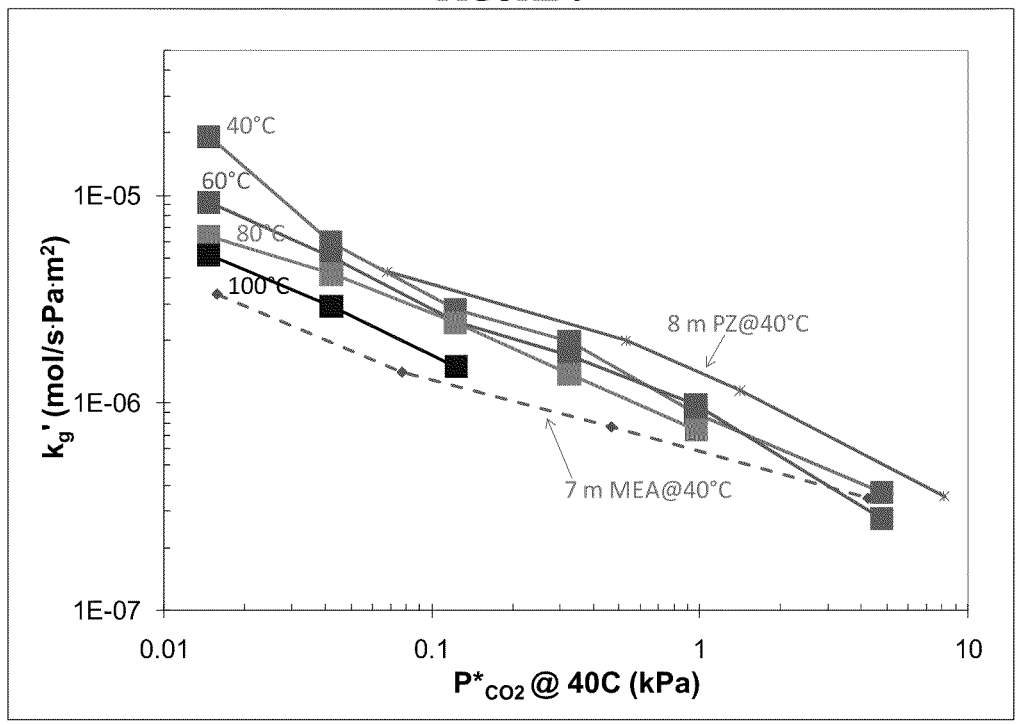
FIG. 6 is a graph depicting $CO_2$ mass transfer rate for 8 m MPZ.

As shown in FIG. 6, kg' for MPZ at 40° C. is again located between MEA and PZ from 0.5 kPa to 5 kPa of P*CO₂. The data for VLE and kg' for PZ-MPZ and MPZ are also tabulated in Table 2 and Table 3.

TABLE 2

CO₂ solubility and kg' at different temperatures for PZ-MPZ.

| Temp (° C.) | CO₂ Loading (mol/mol alka) | $P_{CO2}$ (kPa) | kg' ($\times 10^7$ mol/s · Pa · m²) |
|---|---|---|---|
| 40 | 0.158 | 0.02 | 250.0 |
| 40 | 0.232 | 0.11 | 46.4 |
| 40 | 0.281 | 0.33 | 19.3 |
| 40 | 0.33 | 1.01 | 11.2 |
| 40 | 0.391 | 5.44 | 4.3 |
| 60 | 0.158 | 0.17 | 62.6 |
| 60 | 0.232 | 0.64 | 39.8 |
| 60 | 0.281 | 2.01 | 18.5 |
| 60 | 0.33 | 5.39 | 10.4 |
| 60 | 0.391 | 22.83 | 2.8 |
| 80 | 0.158 | 1.03 | 61.7 |
| 80 | 0.232 | 3.63 | 28.2 |
| 80 | 0.281 | 8.58 | 18.5 |
| 80 | 0.33 | 23.95 | 7.4 |
| 100 | 0.158 | 4.19 | 44.6 |
| 100 | 0.232 | 15.75 | 19.4 |

TABLE 3

CO₂ solubility and kg' at different temperatures for MPZ.

| Temp (° C.) | CO₂ Loading (mol/mol alka) | $P_{CO2}$ (kPa) | kg' ($\times 10^7$ mol/s · Pa · m²) |
|---|---|---|---|
| 40 | 0.102 | 0.01 | 191.0 |
| 40 | 0.154 | 0.04 | 59.2 |
| 40 | 0.203 | 0.12 | 28.1 |
| 40 | 0.253 | 0.32 | 19.7 |
| 40 | 0.3 | 0.96 | 8.9 |
| 40 | 0.365 | 4.73 | 3.7 |
| 60 | 0.102 | 0.09 | 91.7 |
| 60 | 0.154 | 0.29 | 50.2 |
| 60 | 0.203 | 0.86 | 24.5 |
| 60 | 0.253 | 2.26 | 16.8 |
| 60 | 0.3 | 4.87 | 9.8 |
| 60 | 0.365 | 22.41 | 2.8 |
| 80 | 0.102 | 0.59 | 62.8 |
| 80 | 0.154 | 1.80 | 41.4 |
| 80 | 0.203 | 4.06 | 24.5 |
| 80 | 0.253 | 9.72 | 13.7 |
| 80 | 0.3 | 22.06 | 7.4 |
| 100 | 0.102 | 2.68 | 51.2 |
| 100 | 0.154 | 7.39 | 29.0 |
| 100 | 0.203 | 18.65 | 14.9 |

Heat of CO₂ Absorption

Heat of absorption was calculated from the model mentioned above by applying the following thermodynamic equation:

$$\Delta H_{abs} = -R \frac{d(\ln P)}{d(1/T)} \qquad \text{Eqn. 4}$$

TABLE 4

Summary table for all the tested amines

| Amine | Conc. (m) | CO₂ Capacity (mol/kg (water + amine)) | kg' @PCO₂ = 5 kPa ($\times 10^7$ mol/s · Pa · m²) | $\Delta H_{abs}$@PCO₂ = 1.5 kPa (kJ/mol) |
|---|---|---|---|---|
| MDEA/PZ | 7/2 | 0.71 | 5.7 | 67 |
| PZ | 8 | 0.79 | 5.3 | 70 |
| MEA | 7 | 0.47 | 3.1 | 82 |
| HEP | 7.7 | 0.68 | 2.9 | 69 |
| AEP | 6 | 0.66 | 2.3 | 72 |
| 2-PE | 8 | 1.23 | 2 | 73 |
| AMP | 4.8 | 0.96 | 1.7 | 73 |
| EDA | 12 | 0.78 | 1.6 | 80 |
| DGA ® | 10 | 0.38 | 2.4 | 81 |
| PZ-MPZ | 4/4 | 0.84 | 4.3 | 70 |
| MPZ | 8 | 0.93 | 3.1 | 72 |

In Table 4, cyclic capacity, kg' at rich conditions and average heat of absorption of CO₂ for PZ-MPZ and MPZ were compared to MEA, PZ and some other amines. PZ-MPZ is a little bit slower than PZ but has slightly higher capacity. MPZ has the same kg' as MEA but its capacity is about twice of that of MEA. PZ-MPZ and MPZ are both faster than the listed amines other than PZ and MEA. The heat of absorption of PZ-MPZ and MPZ are both similar to PZ.

It is possible that 2-methyl-piperazine would be provided by reductive amination of a mixture of monoethanolamine and monoisopropanolamine with hydrogenation catalysts and excess hydrogen. The product would be a mixture of piperazine, 2-methyl-piperazine, and 2,5-dimethyl-piperazine. This mixture could be used without further separation. A preferred composition of such a mixture in water would be 6 m piperazine, 2 m 2-methyl-piperazine and less than 1 m 2,5-dimethyl-piperazine.

Additional Amines 1-methyl piperazine (1MPZ) has almost the same rate and equilibrium properties as PZ. It differs by the addition of a methyl group at a N (or insertion of —CH₂— between a N and H). 1MPZ will cost more per mole of amine than PZ. Because of the additional methyl group it will be more volatile than PZ. However, 1 MPZ is fully miscible with water so it can be effectively blended with PZ to increase the total amine concentration without the precipitation of solids. The preferred solvent is probably a total concentration of 8 to 10 m total amine containing 1 to 4 m 1-methyl-piperazine with the balance as piperazine.

Amino acids such as taurine are attractive because they are susceptible to biodegradation and are therefore more environmentally acceptable. Amino acids are usually neutralized by 0.8 to 1.2 moles KOH/mole carboxylic acid in applications for CO₂ capture. The maximum aqueous concentration of the amino acid solvent is frequently limited by the precipitation of solids at rich or lean conditions.

Taurine (2-amino-ethanesulfonic acid) partially neutralized by KOH is limited to about 3 M by precipitation of solids at rich conditions. It can be blended with 3-amino-propanesulfonic acid or 2-amino-isopropyl sulfonic acid and partially neutralized by KOH to produce an aqueous solution with a greater concentration of total dissolved amine.

2-methyl-(R)-piperazine probably has a limited solubility in water. It can be blended with 2-methyl-(S)-piperazine to produce the racemic mixture. As shown above, the racemic mixture denoted simply as 2-methyl-piperazine has excellent properties. The preferred solvent is probably 3 to 5 m 2-methyl-(R)-piperazine with 3 to 5 m 2-methyl-(S)-piperazine.

EXAMPLE 2

Piperazine with 1-methyl-piperazine and 1,4-dimethyl-piperazine

Solubility Measurements

Figure 7:
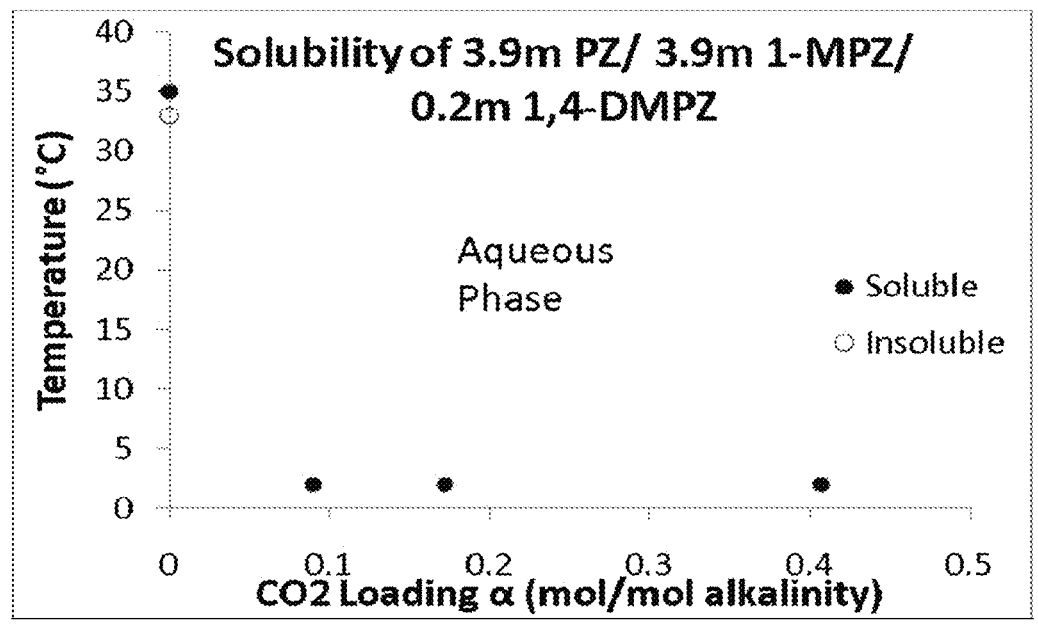
FIG. 7 is a graph showing solubility measurements of a $CO_2$ loaded amine solution containing 3.9 m PZ/3.9 m 1-MPZ/0.2 m 1,4-DMPZ.
Figure 8:
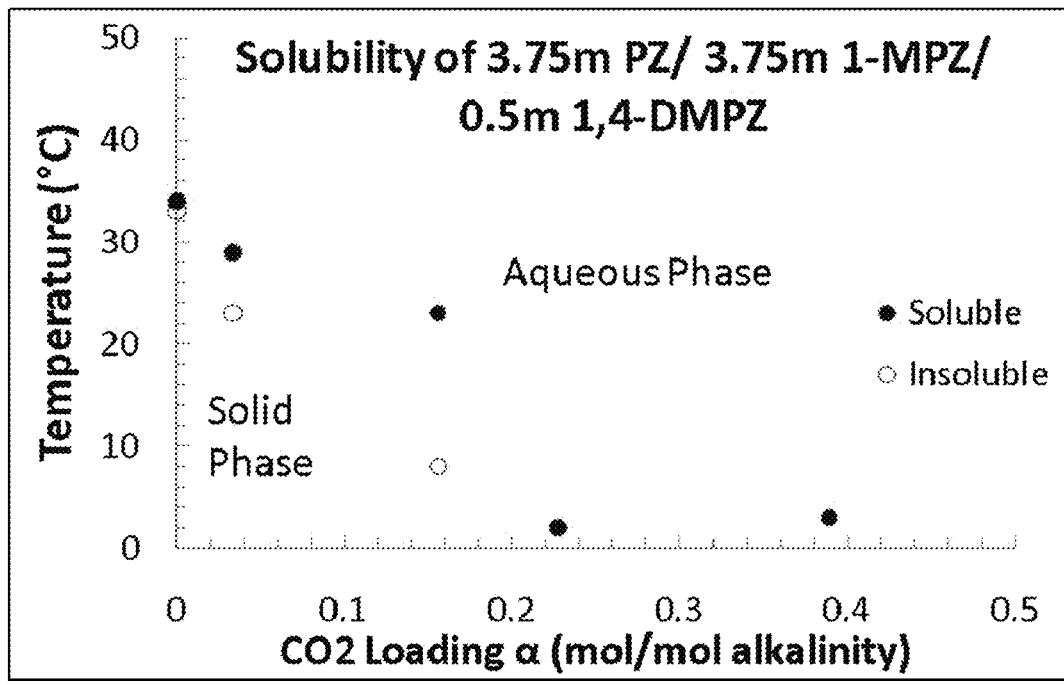
FIG. 8 is a graph showing solubility measurements of a $CO_2$ loaded amine solution containing 3.75 m PZ/3.75 m 1-MPZ/0.5 m 1,4-DMPZ.

Solubility measurements for $CO_2$ loaded 3.9 m PZ/3.9 m 1-MPZ/0.2 m 1,4-DMPZ and 3.75 m PZ/3.75 m 1-MPZ/0.5 m 1,4-DMPZ solutions were taken to predict the solubility envelope of these blends. The solubility of the blends at varying loadings and temperatures are shown in FIG. 7 for the 3.9 m PZ/3.9 m 1-MPZ/0.2 m 1,4-DMPZ blend and in FIG. 8 for the 3.75 m PZ/3.75 m 1-MPZ/0.5 m 1,4-DMPZ blend. While making solutions, it was observed that there was no precipitation when mixing only 1-MPZ in water or only 1,4-DMPZ in water. FIG. 9 shows that blends of piperazine/1-methyl-piperazine/1,4-dimethyl-piperazine are soluble at a lower lean loading that piperazine. At 0° C., the 8 m blend: 3.75 m PZ/3.75 m 1-MPZ/0.5 m 2,5-DMPZ was soluble at 2° C. with a lean loading of 0.17 mol $CO_2$/mol alkalinity, in contrast to 8 m PZ, which must be operated at loading above 0.3 to avoid solids precipitation.

A maximum $CO_2$ loading of 0.41 and 0.39 was obtained for the 3.9 m PZ/3.9 m 1-MPZ/0.2 m 1,4-DMPZ blend and the 3.75 m PZ/3.75 m 1-MPZ/0.5 m 1,4 DMPZ blend respectively at room temperature without any solid precipitation. Intermediary loaded solutions were prepared by appropriately mixing the rich loaded and zero loaded solutions and observed at temperatures between 0° C. and the melting point of the solution. It was expected that the loading could be increased by loading the solution in a chiller at lower temperatures and observing any precipitation of protonated piperazine carbamate ($H^+PZCOO^-.H_2O$) that may form, as with loaded piperazine solutions shown in FIG. 10.

In comparing the solubility window of the blends with PZ, it was predicted that the addition of a tertiary amine (1-MPZ) hinders the ability of producing solid $H^+PZCOO^-.H_2O$. As shown in FIG. 10, in PZ solutions, $H^+PZCOO^-.H_2O$ is formed at loadings of 0.43 and higher for 8 m PZ. Currently, the blends have been loaded up to 0.41 and 0.39 for 3.9 m PZ/3.9 m 1-MPZ/0.2 m 1,4-DMPZ and the 3.75 m PZ/3.75 m 1-MPZ/0.5 m 1,4 DMPZ blends respective without any solid precipitation at temperatures as low as 2° C.

piperazine hexahydrate ($PZ.6H_2O$), also a solid, is formed in PZ loaded solutions of 0.22 and lower at 25° C. for 8 m PZ. Because of a lower concentration of PZ in the blends, the $PZ.6H_2O$ precipitates out at lower temperatures (at approximately 33° C. for both blends) expanding the solubility envelope for both the blends.

Equilibrium and Rate Measurement $CO_2$ solubility for 1-MPZ and the PZ blend are shown in FIG. 11 and FIG. 12 respectively. The filled points are experimental data at varied loadings and temperatures. Parameters for the following semi-empirical VLE equation $$\ln P = a + b/T + c \cdot \alpha + d \cdot \alpha/T + e \cdot \alpha^2 \quad \text{(Eqn. 3)}$$

were regressed and the model was presented as curves in the figures. $\alpha$ is the $CO_2$ loading defined as $n_{CO2}/n_{alka}$. The curves fit the points satisfactorily.

As expected, the VLE curves for the PZ blend fall between those of 1-MPZ and PZ. The cyclic $CO_2$ capacity was calculated by taking the difference between the lean and rich $CO_2$ loading corresponding to 500 Pa and 5,000 Pa $CO_2$ partial pressure respectively. The capacity for 1-MPZ and the PZ blend are 0.83 and 0.88 mol $CO_2$/kg (water+amine), both higher than that of PZ (0.79 mol $CO_2$/kg (water+amine)).

In FIG. 13 and FIG. 14, absorption/desorption rates for 1-MPZ and the PZ blend at 40° C., 60° C., 80° C. and 100° C. are compared with that of 7 m MEA and 8 m PZ at 40° C. In the range of 0.5 kPa to 5 kPa $CO_2$ partial pressure, the rate for 1-MPZ and the PZ blend is nearly the same as 8 m PZ and much higher than 7 m MEA. In addition, temperature does not have a significant effect on the absorption rate of the PZ blend in the practical conditions for absorber (40-60° C.).

The data for VLE and kg' for 1-MPZ and the PZ blend is also tabulated in Table 5 and Table 6 respectively.

TABLE 5

$CO_2$ solubility and kg' at different temperatures for 1-MPZ.

| Temp (° C.) | $CO_2$ Loading (mol/mol alka) | $P_{CO2}$ (kPa) | kg' ($\times 10^7$ mol/s · Pa · m$^2$) |
|---|---|---|---|
| 40 | 0.10 | 0.10 | 21.8 |
| 40 | 0.15 | 0.35 | 22.1 |
| 40 | 0.20 | 1.32 | 12.1 |
| 40 | 0.26 | 5.55 | 4.8 |
| 60 | 0.10 | 0.62 | 42.5 |
| 60 | 0.15 | 2.15 | 21.6 |
| 60 | 0.20 | 6.41 | 10.9 |
| 60 | 0.26 | 22.95 | 4.0 |
| 80 | 0.10 | 3.66 | 30.0 |
| 80 | 0.15 | 10.10 | 17.0 |
| 80 | 0.20 | 25.30 | 7.3 |
| 100 | 0.10 | 12.84 | 21.4 |
| 100 | 0.15 | 33.01 | 10.5 |

TABLE 6

$CO_2$ solubility and kg' at different temperatures for 3.75m PZ/3.75m 1-MPZ/0.5m 1,4-DMPZ.

| Temp (° C.) | $CO_2$ Loading (mol/mol alka) | $P_{CO2}$ (kPa) | kg' ($\times 10^7$ mol/s · Pa · m$^2$) |
|---|---|---|---|
| 40 | 0.209 | 0.3 | 24.8 |
| 40 | 0.249 | 0.8 | 12.4 |
| 40 | 0.290 | 2.1 | 9.2 |
| 40 | 0.320 | 4.5 | 5.6 |
| 60 | 0.209 | 1.7 | 25.5 |
| 60 | 0.249 | 3.8 | 15.0 |
| 60 | 0.290 | 9.9 | 8.7 |
| 60 | 0.320 | 19.0 | 5.1 |
| 80 | 0.209 | 8.0 | 20.1 |
| 80 | 0.249 | 16.8 | 11.3 |
| 100 | 0.209 | 29.2 | 13.1 |

Heat of absorption was calculated from the model mentioned above by applying the Gibbs-Helmholtz equation:

$$\Delta H_{abs} = -R \frac{d(\ln P)}{d(1/T)} \quad \text{(Eqn. 4)}$$

The heat absorption of $CO_2$ at a 1.5 kPa, which is an average $CO_2$ partial pressure for lean and rich solutions, was calculated. The value obtained hereby for 1-MPZ and the PZ blend are both 67 kJ/mol, which is a little bit less than 8 m PZ (70 kJ/mol).

Thermal Degradation

The thermal degradation of 8 m 1-MPZ at 150° C. was studied. The concentration profiles for 1-MPZ and its degradation products are shown in FIG. 15. The main degradation products are PZ, 1,4-DMPZ, formyl amides, and formate.

The recovery of carbon and nitrogen in this experiment was exceptionally good compared to traditional PZ degradation experiments because two major amine based degradation products were recovered and quantified (PZ and 1,4-DMPZ). The overall balance of carbon during the experiment is shown in FIG. 16. At the end of the experiment, 21% of the initial carbon as 1-MPZ was not recovered in the form of the products listed. In the calculations, all the formyl amides calculated from alkaline reversal was assumed to be N-Formyl PZ and was counted as such for the carbon balance.

The thermal degradation of a blend of 4 m PZ and 4 m 1-MPZ at 150° C. was previously studied. The concentration profiles for PZ, 1-MPZ, and the detected degradation products are shown in FIG. 17. The main degradation products produced were formate, formyl amides, 1,4-DMPZ, and some EDA toward the end of the experiment. Based on the results of the 8 m 1-MPZ experiment discussed above, 1,4-DMPZ was expected to be produced as a degradation product.

It has been found that blending of amines caused more degradation of each constituent. For example, when PZ is blended with another amine such as MEA or AMP, both the other amine and PZ are degraded faster than each alone. PZ is a strong nucleophile and can attach the other amines in solution and cause degradation outside of the usual pathways associated with MEA or AMP degradation. PZ can also attack itself, as it does in a solution by itself, but weaker nucleophiles such as MEA or AMP are more susceptible to PZ's attack, causing faster degradation for each than separate.

The fraction of amine remaining for the blend of 4 m PZ/4 m 1-MPZ is compared in FIG. 18. The PZ results are difficult to interpret since little PZ is lost, overall, and the last point in the blend (Dashed Line) appears to have analytical error. The 1-MPZ data show that the loss of 1-MPZ is slightly slower when blended with PZ than alone. This effect may be explained by the combination of two effects. First of all, the concentration is half that of when the amine is alone, 8 m versus 4 m PZ or 1-MPZ. Amine concentration is known to have a large effect on overall degradation rate and this data may just demonstrate this doubling of concentration. Secondly, the results could represent the nucleophilicity of 1-MPZ compared to other amines that have been blended with PZ. The presence of the methyl group on the amino function of 1-MPZ reduces the pKa, and therefore reactivity, of the molecule. The first and second pKa values for 1-MPZ are 9.14 and 4.63 compared to 9.73 and 5.35 for PZ (at 298K). When PZ undergoes a nucleophilic attack of 1-MPZ, this proceeds slower than when PZ is blended with MEA or AMP which it attacks readily.

Three experiments were conducted with the aim of shedding light on the equilibrium between PZ, 1-MPZ, and 1,4-DMPZ. A new solvent concept is to use amines that demonstrate noticeable and perhaps unacceptable levels of overall thermal degradation, but degrade to useful amines. This would be solvents that degrade but maintain their alkalinity, preferable in the form of amines that maintain the ability to react with $CO_2$ to form a carbamate. One example of this concept that is reported here is the use of the equilibrium between PZ, 1-MPZ, and 1,4-DMPZ. 1-MPZ degrades to form nearly equimolar concentrations of PZ and 1,4-DMPZ. PZ as a degradation product is a positive attribute of 1-MPZ as a solvent due to the fast absorption rate of $CO_2$ into PZ. Another offshoot of this concept is to begin with a blend of solvents with the intention that through use in a system, the concentrations will adjust over time and tend toward equilibrium concentrations under the given operational conditions.

To demonstrate this concept, blends of PZ+1-MPZ+1,4-DMPZ were thermally degraded. Solutions with varying compositions were placed in thermal cylinders at 150° C. for up to 15 weeks. At this temperature, some degradation will occur, but the conversion between PZ, 1-MPZ, and 1,4-DMPZ should be able to be observed. Three starting solutions were used: 5 m PZ+2 m 1-MPZ+1 m 1,4-DMPZ (5/2/1), 5 m PZ+2.5 m 1-MPZ+0.5 m 1,4-DMPZ (5/2.5/0.5), and 5 m PZ+1.5 m 1-MPZ+1,4-DMPZ (5/1.5/1.5). To establish the blend concentrations, it was originally hypothesized that the equilibrium concentration would be 5/2/1. Therefore, that blend, as well as two blends with increased or decreased 1-MPZ concentrations were used and the concentration of 1,4-DMPZ was adjusted to maintain a total concentration of 8 m.

The concentration profiles for these three experiments are shown in FIGS. 19 through 21. These figures include the amine concentrations and the concentrations of detected degradation products. All experiments exhibited some degradation, as expected, but the overall level of non-amine degradation products was low. Formate and formyl amides were the primary non-amine degradation products. Ethylenediamine (EDA) was not found in any significant amount in any of the three experiments.

To analyze the equilibrium between PZ+1-MPZ+1,4-DMPZ, an equilibrium constant was calculated from the experimental data. Overall, the expected equilibrium reaction is as follows, where the brackets indicate the concentration of the given species in units of mmol/kg:

$$2\cdot[\text{1-MPZ}] \leftrightarrow [\text{PZ}]+[\text{1,4-DMPZ}] \quad \text{(Eqn. 5)}.$$

The equilibrium constant, $K_{eq}$, of Equation 1 can then be calculated by the following equation:

$$K_{eq} = \frac{[PZ][1,4-DMPZ]}{[1-MPZ]^2} \quad \text{(Eqn. 6)}$$

The goal of this analysis is to determine the concentrations of the three amine species in equilibrium at 150° C. The solution concentrations determined to be in equilibrium would be what was expected in a system with a reboiler temperature of 150° C.

Two other experiments were also performed analyzing the thermal degradation of 8 m 1-MPZ and 4 m PZ/4 m 1-MPZ. Although they did not start with all three amines, the data from these experiments can also be analyzed in terms of the equilibrium constant between the three amines. The $K_{eq}$ for various experiments containing combinations of PZ, 1-MPZ, and 1,4-DMPZ are shown in FIG. 22. In each case, the $K_{eq}$ was calculated according to Equation 4 and plotted against experiment time in weeks.

Most of this data tends toward a common $K_{eq}$ of 0.1 to 0.2. The long term 8 m 1-MPZ experiment demonstrates this tendency toward equilibrium very well.

Degradation of PZ alone will not yield these results as 1-MPZ and 1,4-DMPZ are minor products. However, when a blend begins with at least some methyl-substituted PZs (e.g., 1-MPZ or 1,4-DMPZ), these methyl groups can easily undergo what can be assumed to be a straightforward nucleophilic attack and disproportionation, resulting in switching of the methyl groups between molecules. Overall, the data suggests that any system starting with 1-MPZ will tend toward a $K_{eq}$ of 0.1 to 0.2 at 150° C.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. An aqueous amine solvent comprising water, a first amine, and a second amine, wherein the first amine and the second amine are closely related amines, wherein the first amine is piperazine, and wherein piperazine is present in a concentration of about 2 to 6 molal.

2. The solvent of claim 1 wherein the second amine precipitates solids at rich or lean conditions at a concentration greater than 2 equivalents amine/kg water.

3. The solvent of claim 1 wherein the total amine in the composition is about 30% to 70% by weight.

4. The solvent of claim 1 wherein the second amine is 2-methyl-piperazine, 1-methyl-piperazine, or homopiperazine.

5. The solvent of claim 1 wherein the second amine is 2-methyl-(RS)-piperazine.

6. The solvent of claim 5, further comprising 2,5-dimethyl-piperazine.

7. The solvent of claim 6, wherein piperazine is present in a concentration of 6 molal, 2-methyl-(RS)-piperazine is present in a concentration of 2 molal, and 2,5-dimethyl-piperazine is present in a concentration of less than 1 molal.

8. The solvent of claim 5 wherein 2 methyl-(RS)-piperazine is present in a concentration of about 2 to 6 molal.

9. The solvent of claim 8, wherein piperazine and 2-methyl-(RS)-piperazine are each present in a concentration of 4 molal.

10. The solvent of claim 1 wherein the second amine is 1-methyl-piperazine.

11. The solvent of claim 10 wherein 1 methyl-piperazine is present in a concentration of about 2 to 6 molal.

12. The solvent of claim 10 further comprising dimethyl-piperazine.

13. The solvent of claim 12 wherein the dimethyl-piperazine is 1,4-dimethylpiperazine, 2,5-dimethyl-piperazine, or a combination thereof.

14. An aqueous amine solvent comprising water, a first amine, and a second amine, wherein the first amine and the second amines are closely related amines, wherein the first amine is 2-amino-ethanesulfonic acid, and wherein the first amine contributes at least 50% by weight of the solvent's total amine concentration.

15. The solvent of claim 14 wherein the second amine is selected from the group consisting of 3-amino-propane-sulfonic acid, 2-amino-isopropyl sulfonic acid, and a combination thereof.

16. An aqueous amine solution comprising water, piperazine, and 1-methyl-piperazine, wherein the solvent's total amine concentration is from 8 to 10 molal, and wherein 1-methyl-piperazine is present in a concentration of 1 to 4 molal.

17. An aqueous amine solvent comprising water, piperazine, and 2-methyl-(RS)-piperazine, wherein piperazine is present in a concentration of about 5 to 8 molal, and wherein 2-methyl-(RS)-piperazine is present in a concentration of about 1 to 3 molal.

18. An aqueous amine solvent comprising water, piperazine, and 1-methyl-piperazine, wherein piperazine is present in a concentration of about 5 to 8 molal, and wherein 1-methyl-piperazine is present in a concentration of about 1 to 3 molal.

* * * * *